United States Patent
Lin

(10) Patent No.: US 12,501,482 B2
(45) Date of Patent: Dec. 16, 2025

(54) METHOD AND APPARATUS FOR CHANNEL ACCESS IN A WIRELESS COMMUNICATION SYSTEM

(71) Applicant: ASUSTek Computer Inc., Taipei (TW)

(72) Inventor: Ko-Chiang Lin, Taipei (TW)

(73) Assignee: ASUSTek Computer Inc., Taipei (TW)

( * ) Notice: Subject to any disclaimer, the term of this patent is extended or adjusted under 35 U.S.C. 154(b) by 436 days.

(21) Appl. No.: 17/580,115

(22) Filed: Jan. 20, 2022

(65) Prior Publication Data

US 2022/0232628 A1 Jul. 21, 2022

Related U.S. Application Data

(60) Provisional application No. 63/139,511, filed on Jan. 20, 2021.

(51) Int. Cl.
*H04W 74/08* (2024.01)
*H04W 74/0808* (2024.01)

(52) U.S. Cl.
CPC .............................. *H04W 74/0808* (2013.01)

(58) Field of Classification Search
CPC ......... H04W 74/0808; H04W 74/0891; H04W 48/10; H04W 56/00; H04W 72/23; H04W 88/08; H04L 5/0051; H04L 27/0006
See application file for complete search history.

(56) References Cited

U.S. PATENT DOCUMENTS

| | | | |
|---|---|---|---|
| 11,297,613 B2* | 4/2022 | Yerramalli | H04W 72/51 |
| 11,503,601 B2* | 11/2022 | Hakola | H04B 7/0408 |
| 11,706,074 B2* | 7/2023 | Sun | H04W 74/0808 |
| | | | 370/336 |
| 11,930,532 B2* | 3/2024 | Hu | H04W 72/0446 |
| 2019/0191457 A1* | 6/2019 | Si | H04L 5/0082 |
| 2019/0246335 A1* | 8/2019 | Mukherjee | H04W 48/08 |
| 2020/0252891 A1* | 8/2020 | Chendamarai Kannan | |
| | | | H04W 24/08 |
| 2020/0252923 A1* | 8/2020 | Yerramalli | H04B 7/0695 |
| 2020/0280939 A1* | 9/2020 | Pang | H04L 5/00 |
| 2020/0314917 A1 | 10/2020 | Jeon et al. | |
| 2020/0351955 A1* | 11/2020 | Jeon | H04W 76/27 |
| 2021/0235513 A1 | 7/2021 | Kim et al. | |

(Continued)

FOREIGN PATENT DOCUMENTS

| | | | | |
|---|---|---|---|---|
| EP | 3879895 A1 | 9/2019 | | |
| EP | 4344334 A2 * | 3/2024 | ............ | H04W 56/00 |

(Continued)

OTHER PUBLICATIONS

Moderator (Lenovo), "Email discussion/approval on CSI-RS measurements including validity/presence of periodic/semi-persistent CSI-RS (NR-U DL Signals and Channels)", 3GPP TSG RAN WG1#100bis-e, Agenda Item: 7.2.2.1.2, Document for. Discussion, Decision, e-Meeting, Apr. 20-30, 2020.

(Continued)

*Primary Examiner* — Jay P Patel

(74) *Attorney, Agent, or Firm* — Cooper Legal Group LLC

(57) ABSTRACT

A method and apparatus are disclosed. In an example from the perspective of a base station, the UE performs a first transmission without Listen Before Talk (LBT), wherein the first transmission is a Synchronization Signal Block (SSB) transmission. The UE performs LBT for a second transmission for a signal other than SSB.

21 Claims, 9 Drawing Sheets

(56) References Cited

U.S. PATENT DOCUMENTS

| | | | |
|---|---|---|---|
| 2021/0243808 A1* | 8/2021 | Deenoo | H04B 17/309 |
| 2021/0345314 A1* | 11/2021 | Li | H04W 72/046 |
| 2021/0400725 A1* | 12/2021 | Harada | H04L 5/0005 |
| 2022/0039156 A1* | 2/2022 | Golitschek Edler von Elbwart | H04W 74/0808 |
| 2022/0124807 A1* | 4/2022 | Hu | H04W 74/006 |
| 2022/0131731 A1* | 4/2022 | Yang | H04L 27/2613 |
| 2022/0232546 A1* | 7/2022 | Hakola | H04W 24/08 |
| 2022/0312482 A1* | 9/2022 | Niu | H04W 74/0816 |
| 2022/0322433 A1* | 10/2022 | Zhang | H04L 5/001 |
| 2022/0330339 A1* | 10/2022 | Siomina | H04W 36/04 |
| 2022/0394503 A1* | 12/2022 | He | H04W 72/1268 |
| 2023/0038238 A1* | 2/2023 | Yang | H04W 72/1268 |
| 2023/0054184 A1* | 2/2023 | Loehr | H04W 74/0808 |
| 2023/0058492 A1* | 2/2023 | Wang | H04W 74/0808 |
| 2023/0066772 A1* | 3/2023 | Myung | H04W 74/004 |
| 2023/0072340 A1* | 3/2023 | El Hamss | H04W 74/0808 |
| 2023/0096490 A1* | 3/2023 | Oteri | H04L 5/0053 370/330 |
| 2023/0096755 A1* | 3/2023 | Niu | H04L 27/26025 |
| 2023/0146004 A1* | 5/2023 | Niu | H04L 5/0094 370/329 |
| 2023/0254893 A1* | 8/2023 | Shibaike | H04W 74/0808 370/329 |
| 2024/0015741 A1* | 1/2024 | Tsai | H04L 25/0204 |
| 2024/0031104 A1* | 1/2024 | Liu | H04L 5/0046 |

FOREIGN PATENT DOCUMENTS

| | | |
|---|---|---|
| WO | 2019160331 A1 | 8/2019 |
| WO | 2020095458 A1 | 5/2020 |
| WO | WO-2019157091 A9 * | 8/2020 ........... H04L 1/0013 |

OTHER PUBLICATIONS

Corresponding European Patent Application No. 22152348.3, Extended European Search Report dated May 18, 2022.
Nokia et al., "Design of NR Channel Access Mechanisms for 60 GHz Unlicensed Band", 3GPP TSG RAN WGI #103-e, R1-2009312, e-meeting, Oct. 26-Nov. 13, 2020, Cedex, France, 13 pages.
Qualcomm Incorporated (Moderator), "FL Summary for Channel Access Mechanism for 52.6GHz-71GHz band, ver 10", 3GPP TSG RAN WGI Meeting #103-3, R1-2009760, Oct. 26-Nov. 13, 2020.

* cited by examiner

600 ⟶

| UE DETERMINES WHETHER OR NOT TO PERFORM LBT FOR TRANSMISSION AND/OR HOW TO PERFORM LBT FOR TRANSMISSION BASED ON ONE OR MORE PROPERTIES OF TRANSMISSION |— 605

BASE STATION DETERMINES WHETHER OR NOT TO PERFORM LBT FOR TRANSMISSION AND/OR HOW TO PERFORM LBT FOR TRANSMISSION BASED ON ONE OR MORE PROPERTIES OF TRANSMISSION — 705

FIG. 7

METHOD AND APPARATUS FOR CHANNEL ACCESS IN A WIRELESS COMMUNICATION SYSTEM

CROSS-REFERENCE TO RELATED APPLICATIONS

The present Application claims the benefit of U.S. Provisional Patent Application Ser. No. 63/139,511 filed on Jan. 20, 2021, the entire disclosure of which is incorporated herein in its entirety by reference.

FIELD

This disclosure generally relates to wireless communication networks, and more particularly, to a method and apparatus for channel access in a wireless communication system.

BACKGROUND

With the rapid rise in demand for communication of large amounts of data to and from mobile communication devices, traditional mobile voice communication networks are evolving into networks that communicate with Internet Protocol (IP) data packets. Such IP data packet communication can provide users of mobile communication devices with voice over IP, multimedia, multicast and on-demand communication services.

An exemplary network structure is an Evolved Universal Terrestrial Radio Access Network (E-UTRAN). The E-UTRAN system can provide high data throughput in order to realize the above-noted voice over IP and multimedia services. A new radio technology for the next generation (e.g., 5G) is currently being discussed by the 3GPP standards organization. Accordingly, changes to the current body of 3GPP standard are currently being submitted and considered to evolve and finalize the 3GPP standard.

SUMMARY

In accordance with the present disclosure, one or more devices and/or methods are provided. In an example from the perspective of a base station, the base station performs a first transmission without Listen Before Talk (LBT), wherein the first transmission is a Synchronization Signal Block (SSB) transmission. The base station performs LBT for a second transmission for a signal other than SSB.

In an example from the perspective of a base station, the base station transmits a first signal on a channel without sensing the channel, wherein the first signal comprises a SSB. The base station senses the channel for a transmission of a second signal, wherein the second signal does not comprise a SSB. The base station transmits the second signal on the channel after sensing the channel.

BRIEF DESCRIPTION OF THE DRAWINGS

FIG. 6 is a flow chart according to one exemplary embodiment.

FIG. 7 is a flow chart according to one exemplary embodiment.

DETAILED DESCRIPTION

The exemplary wireless communication systems and devices described below employ a wireless communication system, supporting a broadcast service. Wireless communication systems are widely deployed to provide various types of communication such as voice, data, and so on. These systems may be based on code division multiple access (CDMA), time division multiple access (TDMA), orthogonal frequency division multiple access (OFDMA), $3^{rd}$ Generation Partnership Project (3GPP) LTE (Long Term Evolution) wireless access, 3GPP LTE-A or LTE-Advanced (Long Term Evolution Advanced), 3GPP2 UMB (Ultra Mobile Broadband), WiMax, 3GPP NR (New Radio) wireless access for 5G, or some other modulation techniques.

In particular, the exemplary wireless communication systems devices described below may be designed to support one or more standards such as the standard offered by a consortium named "3rd Generation Partnership Project" referred to herein as 3GPP, including: 3GPP TS 38.211 V15.7.0, "NR physical channels and modulation"; Draft 3GPP TS 37.213 V16.4.0, "NR Physical layer procedures for shared spectrum channel access"; RP-202925, "Revised WID: Extending current NR operation to 71 GHz"; 3GPP TS 38.214 V16.4.0, "NR Physical layer procedures for data". The standards and documents listed above are hereby expressly incorporated by reference in their entirety.

Figure 1:
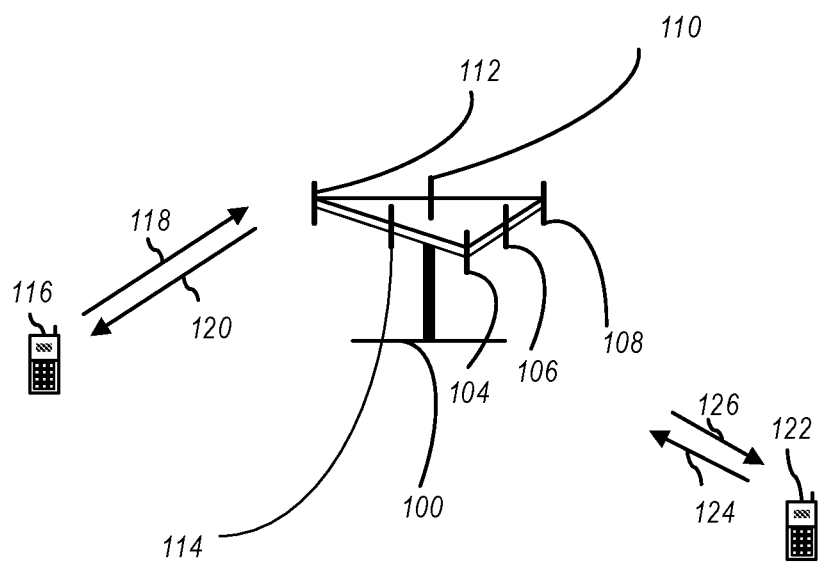
FIG. 1 shows a diagram of a wireless communication system according to one exemplary embodiment.

FIG. 1 presents a multiple access wireless communication system in accordance with one or more embodiments of the disclosure. An access network 100 (AN) includes multiple antenna groups, one including 104 and 106, another including 108 and 110, and an additional including 112 and 114. In FIG. 1, only two antennas are shown for each antenna group, however, more or fewer antennas may be utilized for each antenna group. Access terminal 116 (AT) is in communication with antennas 112 and 114, where antennas 112 and 114 transmit information to access terminal 116 over forward link 120 and receive information from access terminal 116 over reverse link 118. AT 122 is in communication with antennas 106 and 108, where antennas 106 and 108 transmit information to AT 122 over forward link 126 and receive information from AT 122 over reverse link 124. In a frequency-division duplexing (FDD) system, communication links 118, 120, 124 and 126 may use different frequencies for communication. For example, forward link 120 may use a different frequency than that used by reverse link 118.

Each group of antennas and/or the area in which they are designed to communicate is often referred to as a sector of the access network. In the embodiment, antenna groups each may be designed to communicate to access terminals in a sector of the areas covered by access network 100.

In communication over forward links 120 and 126, the transmitting antennas of access network 100 may utilize beamforming in order to improve the signal-to-noise ratio of forward links for the different access terminals 116 and 122. Also, an access network using beamforming to transmit to access terminals scattered randomly through its coverage may normally cause less interference to access terminals in neighboring cells than an access network transmitting through a single antenna to its access terminals.

An access network (AN) may be a fixed station or base station used for communicating with the terminals and may also be referred to as an access point, a Node B, a base station, an enhanced base station, an eNodeB (eNB), a Next Generation NodeB (gNB), or some other terminology. An access terminal (AT) may also be called user equipment (UE), a wireless communication device, terminal, access terminal or some other terminology.

Figure 2:
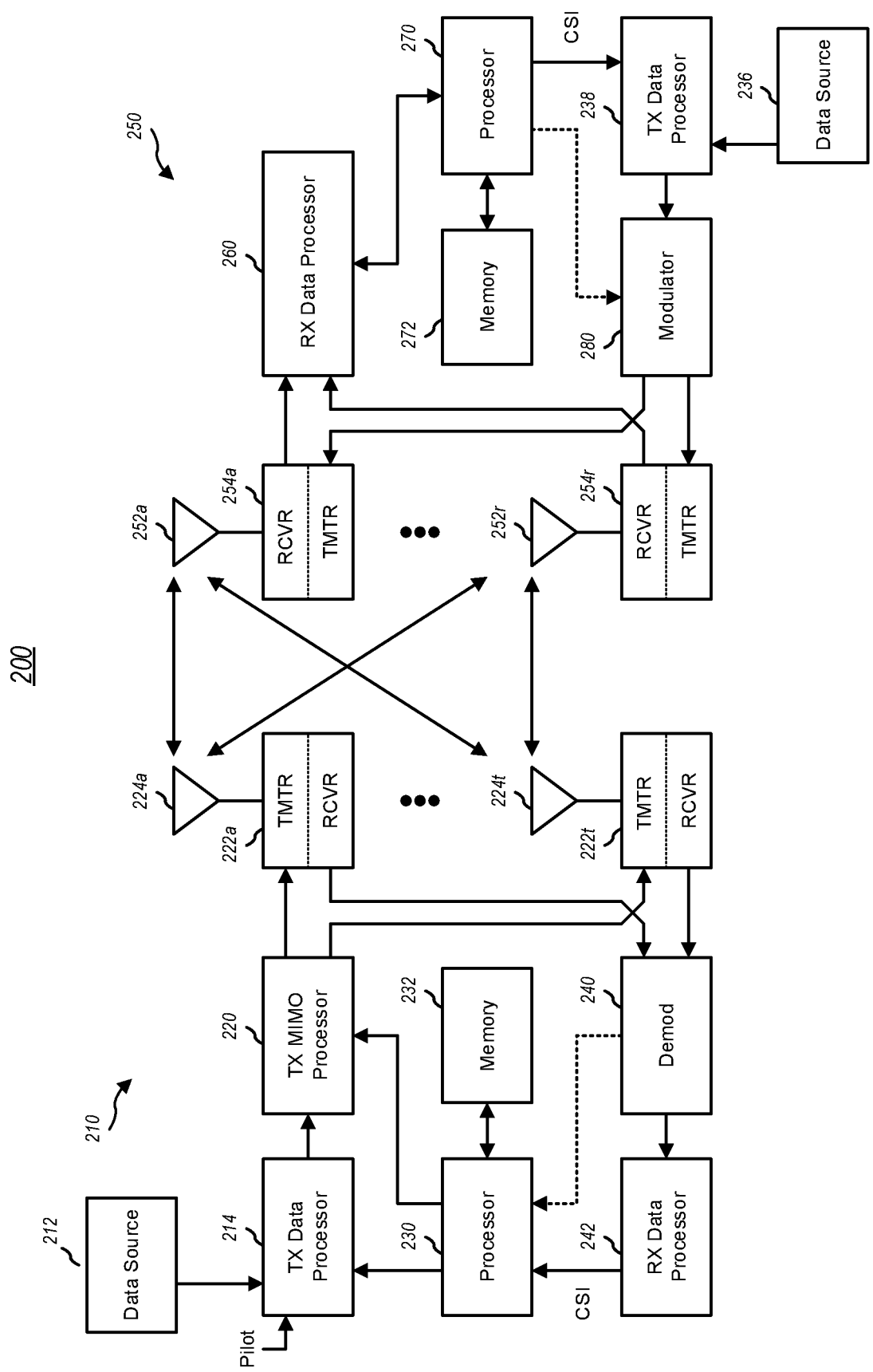
FIG. 2 is a block diagram of a transmitter system (also known as access network) and a receiver system (also known as user equipment or UE) according to one exemplary embodiment.

FIG. 2 presents an embodiment of a transmitter system 210 (also known as the access network) and a receiver system 250 (also known as access terminal (AT) or user equipment (UE)) in a multiple-input and multiple-output (MIMO) system 200. At the transmitter system 210, traffic data for a number of data streams may be provided from a data source 212 to a transmit (TX) data processor 214.

In one embodiment, each data stream is transmitted over a respective transmit antenna. TX data processor 214 formats, codes, and interleaves the traffic data for each data stream based on a particular coding scheme selected for that data stream to provide coded data.

The coded data for each data stream may be multiplexed with pilot data using orthogonal frequency-division multiplexing (OFDM) techniques. The pilot data may typically be a known data pattern that is processed in a known manner and may be used at the receiver system to estimate the channel response. The multiplexed pilot and coded data for each data stream may then be modulated (i.e., symbol mapped) based on a particular modulation scheme (e.g., binary phase shift keying (BPSK), quadrature phase shift keying (QPSK), M-ary phase shift keying (M-PSK), or M-ary quadrature amplitude modulation (M-QAM)) selected for that data stream to provide modulation symbols. The data rate, coding, and/or modulation for each data stream may be determined by instructions performed by processor 230.

The modulation symbols for data streams are then provided to a TX MIMO processor 220, which may further process the modulation symbols (e.g., for OFDM). TX MIMO processor 220 then provides $N_T$ modulation symbol streams to $N_T$ transmitters (TMTR) 222a through 222t. In certain embodiments, TX MIMO processor 220 may apply beamforming weights to the symbols of the data streams and to the antenna from which the symbol is being transmitted.

Each transmitter 222 receives and processes a respective symbol stream to provide one or more analog signals, and further conditions (e.g., amplifies, filters, and/or upconverts) the analog signals to provide a modulated signal suitable for transmission over the MIMO channel. $N_T$ modulated signals from transmitters 222a through 222t may then be transmitted from $N_T$ antennas 224a through 224t, respectively.

At receiver system 250, the transmitted modulated signals are received by $N_R$ antennas 252a through 252r and the received signal from each antenna 252 may be provided to a respective receiver (RCVR) 254a through 254r. Each receiver 254 may condition (e.g., filters, amplifies, and downconverts) a respective received signal, digitize the conditioned signal to provide samples, and/or further process the samples to provide a corresponding "received" symbol stream.

An RX data processor 260 then receives and/or processes the $N_R$ received symbol streams from $N_R$ receivers 254 based on a particular receiver processing technique to provide $N_T$ "detected" symbol streams. The RX data processor 260 may then demodulate, deinterleave, and/or decode each detected symbol stream to recover the traffic data for the data stream. The processing by RX data processor 260 may be complementary to that performed by TX MIMO processor 220 and TX data processor 214 at transmitter system 210.

A processor 270 may periodically determine which precoding matrix to use (discussed below). Processor 270 formulates a reverse link message comprising a matrix index portion and a rank value portion.

The reverse link message may comprise various types of information regarding the communication link and/or the received data stream. The reverse link message may then be processed by a TX data processor 238, which may also receive traffic data for a number of data streams from a data source 236, modulated by a modulator 280, conditioned by transmitters 254a through 254r, and/or transmitted back to transmitter system 210.

At transmitter system 210, the modulated signals from receiver system 250 are received by antennas 224, conditioned by receivers 222, demodulated by a demodulator 240, and processed by a RX data processor 242 to extract the reserve link message transmitted by the receiver system 250. Processor 230 may then determine which pre-coding matrix to use for determining the beamforming weights and may then process the extracted message.

Figure 3:
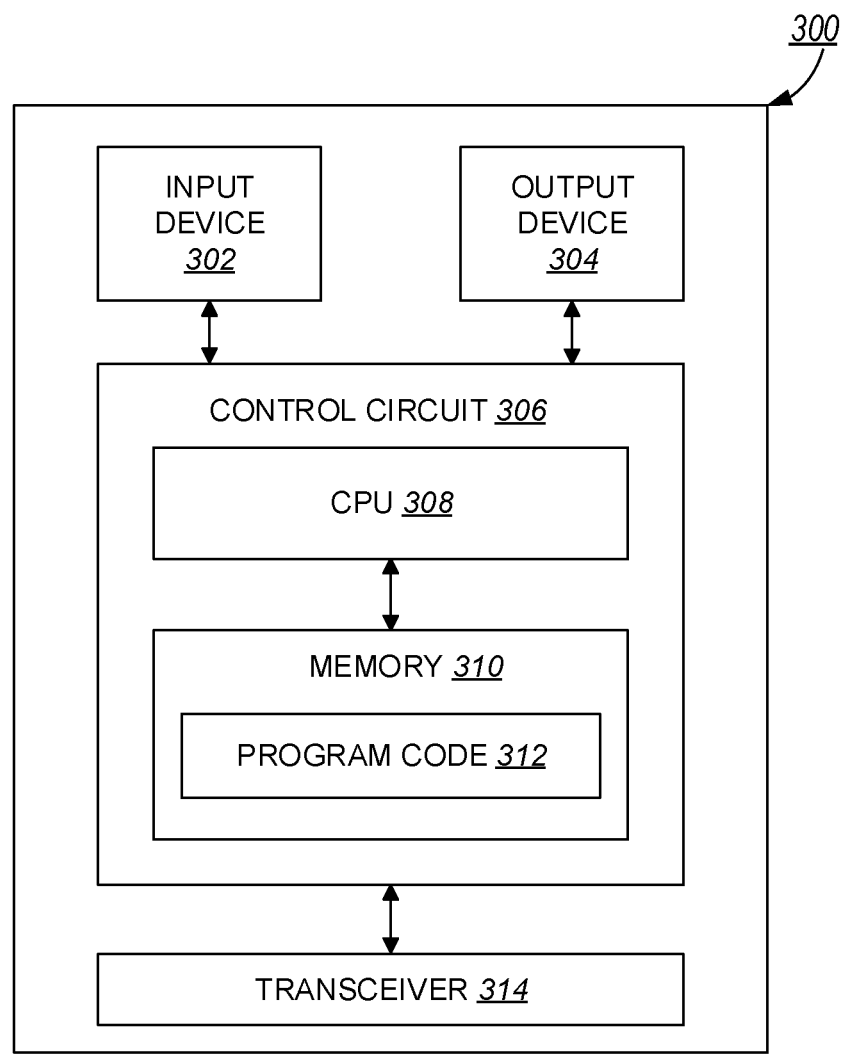
FIG. 3 is a functional block diagram of a communication system according to one exemplary embodiment.

FIG. 3 presents an alternative simplified functional block diagram of a communication device according to one embodiment of the disclosed subject matter. As shown in FIG. 3, the communication device 300 in a wireless communication system can be utilized for realizing the UEs (or ATs) 116 and 122 in FIG. 1 or the base station (or AN) 100 in FIG. 1, and the wireless communications system may be the LTE system or the NR system. The communication device 300 may include an input device 302, an output device 304, a control circuit 306, a central processing unit (CPU) 308, a memory 310, a program code 312, and a transceiver 314. The control circuit 306 executes the program code 312 in the memory 310 through the CPU 308, thereby controlling an operation of the communications device 300. The communications device 300 can receive signals input by a user through the input device 302, such as a keyboard or keypad, and can output images and sounds through the output device 304, such as a monitor or speakers. The transceiver 314 is used to receive and transmit wireless signals, delivering received signals to the control circuit 306, and outputting signals generated by the control circuit 306 wirelessly. The communication device 300 in a wireless communication system can also be utilized for realizing the AN 100 in FIG. 1.

Figure 4:
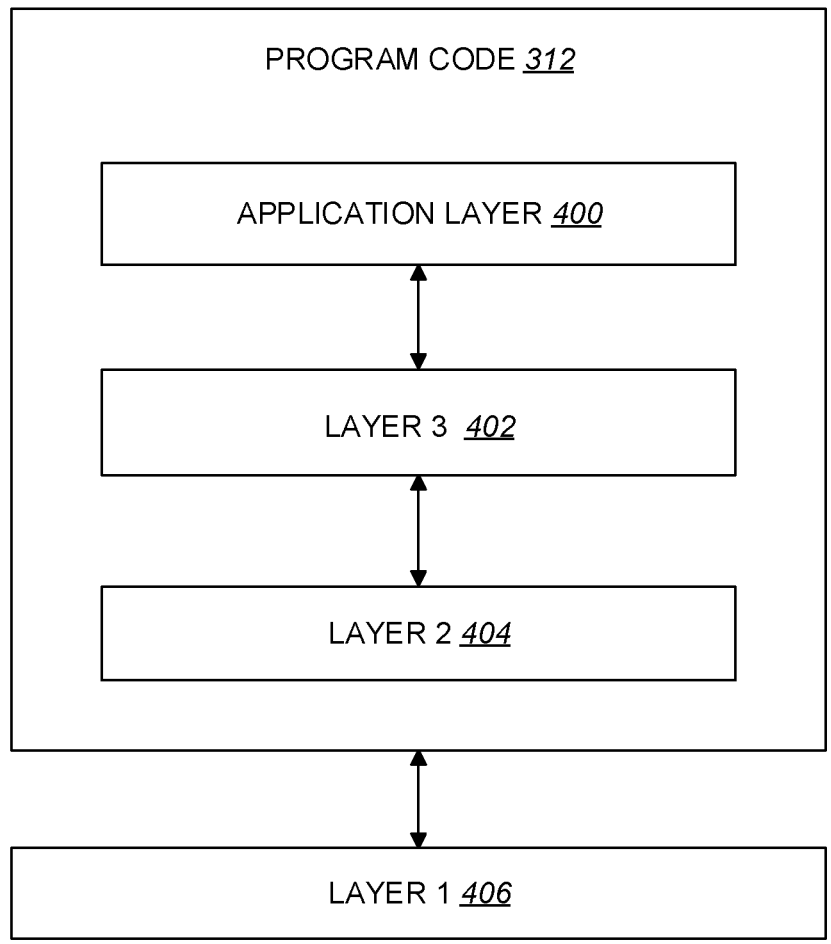
FIG. 4 is a functional block diagram of the program code of FIG. 3 according to one exemplary embodiment.

FIG. 4 is a simplified block diagram of the program code 312 shown in FIG. 3 in accordance with one embodiment of the disclosed subject matter. In this embodiment, the program code 312 includes an application layer 400, a Layer 3 portion 402, and a Layer 2 portion 404, and is coupled to a Layer 1 portion 406. The Layer 3 portion 402 may perform radio resource control. The Layer 2 portion 404 may perform link control. The Layer 1 portion 406 may perform and/or implement physical connections.

One or more frame structures associated with Radio Access Technology (RAT) and/or New RAT (NR) (associated with 5G) may accommodate various requirements associated with time resources and/or frequency resources (e.g., ultra-low latency (e.g., ~0.5 ms)) to delay-tolerant traffic for Machine Type Communication (MTC), from a high peak rate for enhanced Mobile Broadband (eMBB) to a very low data rate for MTC. Low latency (e.g., short Transmission Time Interval (TTI)) and/or mixing/adapting different TTIs may be important for various applications. In addition to diverse services and requirements, forward compatibility is an important consideration in an initial NR frame structure design as not all features of NR would be included in the beginning phase/release of NR.

Reducing protocol latency may be an important improvement between different generations/releases, which can improve efficiency as well as meeting new application requirements (e.g., real-time service). An effective method adopted to reduce latency is to reduce a length of TTIs from 10 milliseconds (ms) in 3G to 1 ms in LTE.

Backward compatibility may not be required in an NR system. Numerology may be adjusted such that reducing a symbol number of a TTI is not the only way to change TTI length. In an example associated with LTE numerology, 14 Orthogonal Frequency Division Multiplexing (OFDM) symbols may be associated with 1 ms and/or a subcarrier spacing of 15 KHz. When the subcarrier spacing increases to 30 KHz, where a Fast Fourier Transform (FFT) size and/or a cyclic prefix (CP) structure may not change, there may be 28 OFDM symbols in 1 ms and/or the TTI may become 0.5 ms if the number of OFDM symbol in a TTI is kept the same. Accordingly, a design between different TTI lengths may be kept common, with scalability performed on the subcarrier spacing. One or more of FFT size, Physical Resource Block (PRB) definition/number, CP design, supportable system bandwidth, subcarrier spacing selection, etc. may be configured in association with subcarrier spacing selection. As NR is associated with a larger system bandwidth and/or a larger coherence bandwidth, inclusion of a larger subcarrier spacing may be beneficial.

Figure 5:
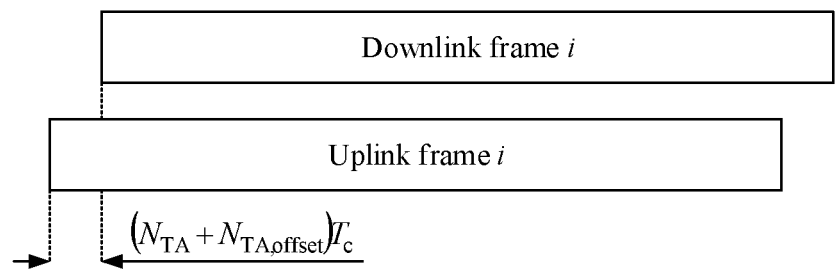
FIG. 5 is a diagram illustrating uplink-downlink timing relation according to one exemplary embodiment.

More details of NR frame structure, channel and/or numerology design are provided in 3GPP TS 38.211 V15.7.0. Notably, FIG. 4.3.1-1 of Section 4.3.1 of 3GPP TS 38.211 V15.7.0, entitled "Uplink-downlink timing relation", is reproduced herein as FIG. 5. One or more parts of 3GPP TS 38.211 V15.7.0 are quoted below:

4 Frame Structure and Physical Resources 4.1 General

Throughout this specification, unless otherwise noted, the size of various fields in the time domain is expressed in time units $T_c=1/(\Delta f_{max} \cdot N_f)$ where $\Delta f_{max}=480 \cdot 10^3$ Hz and $N_f=4096$. The constant $\kappa=T_s/T_c=64$ where $T_s=1/(\Delta f_{ref} \cdot N_{f,ref})$, $\Delta f_{ref}=15 \cdot 10^3$ Hz and $N_{f,ref}=2048$.

4.2 Numerologies

Multiple OFDM numerologies are supported as given by Table 4.2-1 where μ and the cyclic prefix for a bandwidth part are obtained from the higher-layer parameter subcarrierSpacing and cyclicPrefix, respectively.

TABLE 4.2-1

Supported transmission numerologies.

| μ | $\Delta f = 2^\mu \cdot 15$ [kHz] | Cyclic prefix |
|---|---|---|
| 0 | 15 | Normal |
| 1 | 30 | Normal |
| 2 | 60 | Normal, Extended |
| 3 | 120 | Normal |
| 4 | 240 | Normal |

4.3 Frame Structure 4.3.1 Frames and Subframes

Downlink and uplink transmissions are organized into frames with $T_f=(\Delta f_{max} N_f/100) \cdot T_c=10$ ms duration, each consisting of ten subframes of $T_{sf}=(\Delta f_{max} N_f/1000) \cdot T_c=1$ ms duration. The number of consecutive OFDM symbols per subframe is $N_{symb}^{subframe,\mu}=N_{symb}^{slot} N_{slot}^{subframe,\mu}$. Each frame is divided into two equally-sized half-frames of five subframes each with half-frame 0 consisting of subframes 0-4 and half-frame 1 consisting of subframes 5-9.

There is one set of frames in the uplink and one set of frames in the downlink on a carrier.

Uplink frame number i for transmission from the UE shall start $T_{TA}=(N_{TA}+N_{TAoffset})T_c$ before the start of the corresponding downlink frame at the UE where $N_{TAoffset}$ is given by [5, TS 38.213].

FIG. 4.3.1-1: Uplink-Downlink Timing Relation 4.3.2 Slots

For subcarrier spacing configuration μ, slots are numbered $n_s^\mu \in \{0, \ldots, N_{slot}^{subframe,\mu}-1\}$ in increasing order within a subframe and $n_{s,f}^\mu \in \{0, \ldots, N_{slot}^{frame,\mu}-1\}$ in increasing order within a frame. There are $N_{symb}^{slot}$ consecutive OFDM symbols in a slot where $N_{symb}^{slot}$ depends on the cyclic prefix as given by Tables 4.3.2-1 and 4.3.2-2. The start of slot $n_s^\mu$ in a subframe is aligned in time with the start of OFDM symbol $n_s^\mu N_{symb}^{slot}$ in the same subframe.

OFDM symbols in a slot can be classified as 'downlink', 'flexible', or 'uplink'. Signaling of slot formats is described in subclause 11.1 of [5, TS 38.213].

In a slot in a downlink frame, the UE shall assume that downlink transmissions only occur in 'downlink' or 'flexible' symbols.

In a slot in an uplink frame, the UE shall only transmit in 'uplink' or 'flexible' symbols.

A UE not capable of full-duplex communication and not supporting simultaneous transmission and reception as defined by paremeter simultaneousRxTxInterBandENDC, simultaneousRxTxInterBandCA or simultaneousRxTxSUL [10, TS 38.306] among all cells within a group of cells is not expected to transmit in the uplink in one cell within the group of cells earlier than $N_{Rx-Tx}T_c$ after the end of the last received downlink symbol in the same or different cell within the group of cells where $N_{Rx-Tx}$ is given by Table 4.3.2-3.

A UE not capable of full-duplex communication and not supporting simultaneous transmission and reception as defined by parameter simultaneousRxTxInterBandENDC, simultaneousRxTxInterBandCA or simultaneousRxTxSUL [10, TS 38.306] among all cells within a group of cells is not expected to receive in the downlink in one cell within the group of cells earlier than $N_{Tx-Rx}T_c$ after the end of the last transmitted uplink symbol in the same or different cell within the group of cells where $N_{Tx-Rx}$ is given by Table 4.3.2-3.

A UE not capable of full-duplex communication is not expected to transmit in the uplink earlier than $N_{Rx-Tx}T_c$ after the end of the last received downlink symbol in the same cell where $N_{Rx-Tx}$ is given by Table 4.3.2-3.

A UE not capable of full-duplex communication is not expected to receive in the downlink earlier than $N_{Tx-Rx}T_c$ after the end of the last transmitted uplink symbol in the same cell where $N_{Tx-Rx}$ is given by Table 4.3.2-3.

TABLE 4.3.2-1

Number of OFDM symbols per slot, slots per frame,
and slots per subframe for normal cyclic prefix.

| μ | $N_{symb}^{slot}$ | $N_{slot}^{frame, \mu}$ | $N_{slot}^{subframe, \mu}$ |
|---|---|---|---|
| 0 | 14 | 10 | 1 |
| 1 | 14 | 20 | 2 |
| 2 | 14 | 40 | 4 |
| 3 | 14 | 80 | 8 |
| 4 | 14 | 160 | 16 |

TABLE 4.3.2-2

Number of OFDM symbols per slot, slots per frame,
and slots per subframe for extended cyclic prefix.

| μ | $N_{symb}^{slot}$ | $N_{slot}^{frame, \mu}$ | $N_{slot}^{subframe, \mu}$ |
|---|---|---|---|
| 2 | 12 | 40 | 4 |

TABLE 4.3.2-3

Transition time $N_{Rx-Tx}$ and $N_{Tx-Rx}$

| Transition time | FR1 | FR2 |
|---|---|---|
| $N_{Tx-Rx}$ | 25600 | 13792 |
| $N_{Rx-Tx}$ | 25600 | 13792 |

4.4 Physical Resources 4.4.1 Antenna Ports

An antenna port is defined such that the channel over which a symbol on the antenna port is conveyed can be inferred from the channel over which another symbol on the same antenna port is conveyed.

For DM-RS associated with a PDSCH, the channel over which a PDSCH symbol on one antenna port is conveyed can be inferred from the channel over which a DM-RS symbol on the same antenna port is conveyed only if the two symbols are within the same resource as the scheduled PDSCH, in the same slot, and in the same PRG as described in clause 5.1.2.3 of [6, TS 38.214].

For DM-RS associated with a PDCCH, the channel over which a PDCCH symbol on one antenna port is conveyed can be inferred from the channel over which a DM-RS symbol on the same antenna port is conveyed only if the two symbols are within resources for which the UE may assume the same precoding being used as described in clause 7.3.2.2.

For DM-RS associated with a PBCH, the channel over which a PBCH symbol on one antenna port is conveyed can be inferred from the channel over which a DM-RS symbol on the same antenna port is conveyed only if the two symbols are within a SS/PBCH block transmitted within the same slot, and with the same block index according to clause 7.4.3.1.

Two antenna ports are said to be quasi co-located if the large-scale properties of the channel over which a symbol on one antenna port is conveyed can be inferred from the channel over which a symbol on the other antenna port is conveyed. The large-scale properties include one or more of delay spread, Doppler spread, Doppler shift, average gain, average delay, and spatial Rx parameters.

4.4.2 Resource Grid

For each numerology and carrier, a resource grid of $N_{grid,x}^{size,\mu} N_{sc}^{RB}$ subcarriers and $N_{symb}^{subframe,\mu}$ OFDM symbols is defined, starting at common resource block $N_{grid}^{start,\mu}$ indicated by higher-layer signalling. There is one set of resource grids per transmission direction (uplink or downlink) with the subscript x set to DL and UL for downlink and uplink, respectively. When there is no risk for confusion, the subscript x may be dropped. There is one resource grid for a given antenna port p, subcarrier spacing configuration μ, and transmission direction (downlink or uplink).

The carrier bandwidth $N_{grid}^{size,\mu}$ for subcarrier spacing configuration μ is given by the higher-layer parameter carrierBandwidth in the SCS-SpecificCarrier IE. The starting position $N_{grid}^{start,\mu}$ for subcarrier spacing configuration μ is given by the higher-layer parameter offsetToCarrier in the SCS-SpecificCarrier IE.

The frequency location of a subcarrier refers to the center frequency of that subcarrier.

For the downlink, the higher-layer parameter txDirectCurrentLocation in the SCS-Specific Carrier IE indicates the location of the transmitter DC subcarrier in the downlink for each of the numerologies configured in the downlink Values in the range 0-3299 represent the number of the DC subcarrier and the value 3300 indicates that the DC subcarrier is located outside the resource grid.

For the uplink, the higher-layer parameter txDirectCurrentLocation in the UplinkTxDirectCurrentBWP IE indicates the location of the transmitter DC subcarrier in the uplink for each of the configured bandwidth parts, including whether the DC subcarrier location is offset by 7.5 kHz relative to the center of the indicated subcarrier or not. Values in the range 0-3299 represent the number of the DC subcarrier, the value 3300 indicates that the DC subcarrier is located outside the resource grid, and the value 3301 indicates that the position of the DC subcarrier in the uplink is undetermined.

4.4.3 Resource Elements

Each element in the resource grid for antenna port p and subcarrier spacing configuration μ is called a resource element and is uniquely identified by $(k, l)_{p,\mu}$ where k is the index in the frequency domain and l refers to the symbol position in the time domain relative to some reference point. Resource element $(k, l)_{p,\mu}$ corresponds to a physical resource and the complex value $a_{k,l}^{(p,\mu)}$. When there is no risk for confusion, or no particular antenna port or subcarrier spacing is specified, the indices p and μ may be dropped, resulting in $a_{k,l}^{(p)}$ or $a_{k,l}$.

4.4.4 Resource Blocks 4.4.4.1 General

A resource block is defined as $N_{sc}^{RB}=12$ consecutive subcarriers in the frequency domain.

4.4.4.2 Point A

Point A serves as a common reference point for resource block grids and is obtained from:

offsetToPointA for a PCell downlink where offsetToPointA represents the frequency offset between point A and the lowest subcarrier of the lowest resource block, which has the subcarrier spacing provided by the higher-layer parameter subCarrierSpacingCommon and overlaps with the SS/PBCH block used by the UE for initial cell selection, expressed in units of resource blocks assuming 15 kHz subcarrier spacing for FR1 and 60 kHz subcarrier spacing for FR2;

absoluteFrequencyPointA for all other cases where absoluteFrequencyPointA represents the frequency-location of point A expressed as in ARFCN.

4.4.4.3 Common Resource Blocks

Common resource blocks are numbered from 0 and upwards in the frequency domain for subcarrier spacing configuration µ. The center of subcarrier 0 of common resource block 0 for subcarrier spacing configuration µ coincides with 'point A'.

The relation between the common resource block number $n_{CRB}^{\mu}$ in the frequency domain and resource elements (k, l) for subcarrier spacing configuration µ is given by $$n_{CRB}^{\mu} = \left\lfloor \frac{k}{N_{sc}^{RB}} \right\rfloor$$

where k is defined relative to point A such that k=0 corresponds to the subcarrier centered around point A.

4.4.4.4 Physical Resource Blocks

Physical resource blocks for subcarrier configuration µ are defined within a bandwidth part and numbered from 0 to $N_{BWP,i}^{size,\mu}-1$ where i is the number of the bandwidth part. The relation between the physical resource block $n_{PRB}^{\mu}$ in bandwidth part i and the common resource block $n_{CRB}^{\mu}$ is given by $$n_{CRB}^{\mu} = n_{PRB}^{\mu} + N_{BWP,i}^{start,\mu}$$

where $N_{BWP,i}^{start,\mu}$ is the common resource block where bandwidth part starts relative to common resource block 0. When there is no risk for confusion the index µ may be dropped.

4.4.4.5 Virtual Resource Blocks

Virtual resource blocks are defined within a bandwidth part and numbered from 0 to $N_{BWP,i}^{size}-1$ where i is the number of the bandwidth part.

4.4.5 Bandwidth Part

A bandwidth part is a subset of contiguous common resource blocks defined in subclause 4.4.4.3 for a given numerology $\mu_i$ in bandwidth part i on a given carrier. The starting position $N_{BWP,i}^{start,\mu}$ and the number of resource blocks $N_{BWP,i}^{size,\mu}$ in a bandwidth part shall fulfil $N_{grid,x}^{start,\mu} \leq N_{BWP,i}^{start,\mu} < N_{grid,x}^{start,\mu} + N_{grid,x}^{size,\mu}$ and $N_{grid,x}^{start,\mu} < N_{BWP,i}^{start,\mu} + N_{BWP,i}^{size,\mu} \leq N_{grid,x}^{start,\mu} + N_{grid,x}^{size,\mu}$, respectively. Configuration of a bandwidth part is described in clause 12 of [5, TS 38.213].

A UE can be configured with up to four bandwidth parts in the downlink with a single downlink bandwidth part being active at a given time. The UE is not expected to receive PDSCH, PDCCH, or CSI-RS (except for RRM) outside an active bandwidth part.

A UE can be configured with up to four bandwidth parts in the uplink with a single uplink bandwidth part being active at a given time. If a UE is configured with a supplementary uplink, the UE can in addition be configured with up to four bandwidth parts in the supplementary uplink with a single supplementary uplink bandwidth part being active at a given time. The UE shall not transmit PUSCH or PUCCH outside an active bandwidth part. For an active cell, the UE shall not transmit SRS outside an active bandwidth part.

Unless otherwise noted, the description in this specification applies to each of the bandwidth parts. When there is no risk of confusion, the index µ may be dropped from $N_{BWP,i}^{start,\mu}$, $N_{BWP,i}^{size,\mu}$, $N_{grid,x}^{start,\mu}$, and $N_{grid,x}^{size,\mu}$.

4.5 Carrier Aggregation

Transmissions in multiple cells can be aggregated. Unless otherwise noted, the description in this specification applies to each of the serving cells.

When accessing an unlicensed spectrum (e.g., a shared spectrum) one or more mechanisms for determining whether or not a device (e.g., a UE and/or a base station, such as an access node) may access the unlicensed spectrum (e.g., whether or not the device can perform a transmission, such as a transmission in the unlicensed spectrum) may be required (to ensure fairness for some and/or all devices on the unlicensed spectrum, for example). For example, a device may detect and/or receive a signal on the unlicensed spectrum (e.g., on a serving cell associated with the unlicensed spectrum) to determine (e.g., judge) whether or not the spectrum is available for utilization. In some examples, when a device detects nothing and/or silence (e.g., for a certain period of time), the device may consider the unlicensed spectrum to be available and/or may perform a transmission (e.g., a transmission in the unlicensed spectrum). On the other hand, when a device detects one or more signals on the spectrum (e.g., one or more signals, with one or more strengths exceeding a threshold, from one or more other devices), the device may consider the spectrum to be currently occupied and may delay (e.g., hold off) a transmission of the device. This kind of mechanism may be known as listen before talk (LBT). There may be one or more additional aspects regarding how LBT is implemented, such as a threshold for a device to determine (e.g., judge) whether or not the channel is currently occupied (e.g., a device may consider a signal with a strength less than a threshold to be silence), how long the device performs detection and/or how to proceed following a device failing a trial of LBT (e.g., when and/or how to perform another trial of detection). More details of channel accessing scheme may be found in one or more parts of Draft 3GPP TS 37.213 V16.4.0 quoted below:

4 Channel Access Procedure 4.0 General

Unless otherwise noted, the definitions below are applicable for the following terminologies used in this specification:

A channel refers to a carrier or a part of a carrier consisting of a contiguous set of resource blocks (RBs) on which a channel access procedure is performed in shared spectrum.

A channel access procedure is a procedure based on sensing that evaluates the availability of a channel for performing transmissions. The basic unit for sensing is a sensing slot with a duration $T_{sl}=9$ us. The sensing slot duration $T_{sl}$ is considered to be idle if an eNB/gNB or a UE senses the channel during the sensing slot duration, and determines that the detected power for at least 4 us within the sensing slot duration is less than energy detection threshold $X_{Thresh}$. Otherwise, the sensing slot duration $T_{sl}$ is considered to be busy.

A channel occupancy refers to transmission(s) on channel(s) by eNB/gNB/UE(s) after performing the corresponding channel access procedures in this clause.

A Channel Occupancy Time refers to the total time for which eNB/gNB/UE and any eNB/gNB/UE(s) sharing the channel occupancy perform transmission(s) on a channel after an eNB/gNB/UE performs the corresponding channel access procedures described in this clause. For determining a Channel Occupancy Time, if a transmission gap is less than or equal to 25 us, the gap duration is counted in the channel occupancy time. A channel occupancy time can be shared for transmission between an eNB/gNB and the corresponding UE(s).

A DL transmission burst is defined as a set of transmissions from an eNB/gNB without any gaps greater than 16 us. Transmissions from an eNB/gNB separated by a gap of more than 16 us are considered as separate DL transmission bursts. An eNB/gNB can transmit transmission(s) after a gap within a DL transmission burst without sensing the corresponding channel(s) for availability.

A UL transmission burst is defined as a set of transmissions from a UE without any gaps greater than 16 us. Transmissions from a UE separated by a gap of more than 16 us are considered as separate UL transmission bursts. A UE can transmit transmission(s) after a gap within a UL transmission burst without sensing the corresponding channel(s) for availability.

A discovery burst refers to a DL transmission burst including a set of signal(s) and/or channel(s) confined within a window and associated with a duty cycle. The discovery burst can be any of the following:

Transmission(s) initiated by an eNB that includes a primary synchronization signal (PSS), secondary synchronization signal (SSS) and cell-specific reference signal(s) (CRS) and may include non-zero power CSI reference signals (CSI-RS).

Transmission(s) initiated by a gNB that includes at least an SS/PBCH block consisting of a primary synchronization signal (PSS), secondary synchronization signal (SSS), physical broadcast channel (PBCH) with associated demodulation reference signal (DM-RS) and may also include CORESET for PDCCH scheduling PDSCH with SIB1, and PDSCH carrying SIB1 and/or non-zero power CSI reference signals (CSI-RS).

4.1 Downlink Channel Access Procedures

An eNB operating LAA Scell(s) on channel(s) and a gNB performing transmission(s) on channel(s) shall perform the channel access procedures described in this clause for accessing the channel(s) on which the transmission(s) are performed.

In this clause, $X_{Thresh}$ for sensing is adjusted as described in clause 4.1.5 when applicable.

A gNB performs channel access procedures in this clause unless the higher layer parameter ChannelAccessMode-r16 is provided and ChannelAccessMode-r16='semistatic'.

4.1.1 Type 1 DL Channel Access Procedures

This clause describes channel access procedures to be performed by an eNB/gNB where the time duration spanned by the sensing slots that are sensed to be idle before a downlink transmission(s) is random. The clause is applicable to the following transmissions:

Transmission(s) initiated by an eNB including PDSCH/PDCCH/EPDCCH, or

Transmission(s) initiated by a gNB including unicast PDSCH with user plane data, or unicast PDSCH with user plane data and unicast PDCCH scheduling user plane data, or Transmission(s) initiated by a gNB with only discovery burst or with discovery burst multiplexed with non-unicast information, where the transmission(s) duration is larger than 1 ms or the transmission causes the discovery burst duty cycle to exceed 1/20.

The eNB/gNB may transmit a transmission after first sensing the channel to be idle during the sensing slot durations of a defer duration $T_d$ and after the counter N is zero in step 4. The counter N is adjusted by sensing the channel for additional sensing slot duration(s) according to the steps below:

1) set $N=N_{init}$, where $N_{init}$ is a random number uniformly distributed between 0 and $CW_p$, and go to step 4;

2) if N>0 and the eNB/gNB chooses to decrement the counter, set N=N-1;

3) sense the channel for an additional sensing slot duration, and if the additional sensing slot duration is idle, go to step 4; else, go to step 5;

4) if N=0, stop; else, go to step 2.

5) sense the channel until either a busy sensing slot is detected within an additional defer duration $T_d$ or all the sensing slots of the additional defer duration $T_d$ are detected to be idle;

6) if the channel is sensed to be idle during all the sensing slot durations of the additional defer duration $T_d$, go to step 4; else, go to step 5;

If an eNB/gNB has not transmitted a transmission after step 4 in the procedure above, the eNB/gNB may transmit a transmission on the channel, if the channel is sensed to be idle at least in a sensing slot duration $T_{sl}$ when the eNB/gNB is ready to transmit and if the channel has been sensed to be idle during all the sensing slot durations of a defer duration $T_d$ immediately before this transmission. If the channel has not been sensed to be idle in a sensing slot duration $T_{sl}$ when the eNB/gNB first senses the channel after it is ready to transmit or if the channel has been sensed to be not idle during any of the sensing slot durations of a defer duration $T_d$ immediately before this intended transmission, the eNB/gNB proceeds to step 1 after sensing the channel to be idle during the sensing slot durations of a defer duration $T_d$.

The defer duration $T_d$ consists of duration $T_f=16$ us immediately followed by $m_p$ consecutive sensing slot durations $T_{sl}$, and $T_f$ includes an idle sensing slot duration $T_{sl}$ at start of $T_f$.

$CW_{min,p} \leq CW_p \leq CW_{max,p}$ is the contention window. $CW_p$ adjustment is described in clause 4.1.4.

$CW_{min,p}$ and $CW_{max,p}$ are chosen before step 1 of the procedure above.

$m_p$, $CW_{min,p}$, and $CW_{max,p}$ are based on a channel access priority class p associated with the eNB/gNB transmission, as shown in Table 4.1.1-1.

An eNB/gNB shall not transmit on a channel for a Channel Occupancy Time that exceeds $T_{m\ cot,p}$ where the channel access procedures are performed based on a channel access priority class p associated with the eNB/gNB transmissions, as given in Table 4.1.1-1.

If an eNB/gNB transmits discovery burst(s) as described in clause 4.1.2 when N>0 in the procedure above, the eNB/gNB shall not decrement N during the sensing slot duration(s) overlapping with discovery burst(s).

A gNB may use any channel access priority class for performing the procedures above to transmit transmission(s) including discovery burst(s) satisfying the conditions described in this clause.

A gNB shall use a channel access priority class applicable to the unicast user plane data multiplexed in PDSCH for performing the procedures above to transmit transmission(s) including unicast PDSCH with user plane data.

For p=3 and =4, if the absence of any other technology sharing the channel can be guaranteed on a long term basis (e.g. by level of regulation), $T_{m\ cot,p}=10$ ms, otherwise, $T_{m\ cot,p}=8$ ms.

TABLE 4.1.1-1

Channel Access Priority Class (CAPC)

| Channel Access Priority Class (p) | $m_p$ | $CW_{min,p}$ | $CW_{max,p}$ | $T_{m\_cot,p}$ | Allowed $CW_p$ sizes |
|---|---|---|---|---|---|
| 1 | 1 | 3 | 7 | 2 ms | {3, 7} |
| 2 | 1 | 7 | 15 | 3 ms | {7, 15} |
| 3 | 3 | 15 | 63 | 8 or 10 ms | {15, 31, 63} |
| 4 | 7 | 15 | 1023 | 8 or 10 ms | {15, 31, 63, 127, 255, 511, 1023} |

4.1.1.1 Regional Limitations on Channel Occupancy Time

In Japan, if an eNB/gNB has transmitted a transmission after N=0 in step 4 of the procedure above, the eNB/gNB may transmit the next continuous transmission, for duration of maximum $T_j$=4 ms, immediately after sensing the channel to be idle for at least a sensing interval of $T_{js}$=34 us and if the total sensing and transmission time is not more than $$1000 \cdot T_{mcot} + \left\lceil \frac{T_{mcot}}{T_j} - 1 \right\rceil \cdot T_{js} us.$$

The sensing interval $T_{js}$ consists of duration $T_f$=16 us immediately followed by two sensing slots and $T_f$ includes an idle sensing slot at start of $T_f$. The channel is considered to be idle for $T_{js}$ if it is sensed to be idle during the sensing slot durations of $T_{js}$.

4.1.2 Type 2 DL Channel Access Procedures

This clause describes channel access procedures to be performed by an eNB/gNB where the time duration spanned by sensing slots that are sensed to be idle before a downlink transmission(s) is deterministic.

If an eNB performs Type 2 DL channel access procedures, it follows the procedures described in clause 4.1.2.1.

Type 2A channel access procedures as described in clause 4.1.2.1 are applicable to the following transmission(s) performed by an eNB/gNB:

Transmission(s) initiated by an eNB including discovery burst and not including PDSCH where the transmission(s) duration is at most 1 ms, or Transmission(s) initiated by a gNB with only discovery burst or with discovery burst multiplexed with non-unicast information, where the transmission(s) duration is at most 1 ms, and the discovery burst duty cycle is at most 1/20, or Transmission(s) by an eNB/gNB following transmission(s) by a UE after a gap of 25 us in a shared channel occupancy as described in clause 4.1.3.

Type 2B or Type 2C DL channel access procedures as described in clause 4.1.2.2 and 4.1.2.3, respectively, are applicable to the transmission(s) performed by a gNB following transmission(s) by a UE after a gap of 16 us or up to 16 us, respectively, in a shared channel occupancy as described in clause 4.1.3.

4.1.2.1 Type 2A DL Channel Access Procedures

An eNB/gNB may transmit a DL transmission immediately after sensing the channel to be idle for at least a sensing interval $T_{short\_dl}$=25 us. $T_{short\_dl}$ consists of a duration $T_f$=16 us immediately followed by one sensing slot and $T_f$ includes a sensing slot at start of $T_f$. The channel is considered to be idle for $T_{short\_dl}$ if both sensing slots of $T_{short\_dl}$ are sensed to be idle.

4.1.2.2 Type 2B DL Channel Access Procedures

A gNB may transmit a DL transmission immediately after sensing the channel to be idle within a duration of $T_f$=16 us. $T_f$ includes a sensing slot that occurs within the last 9 us of $T_f$. The channel is considered to be idle within the duration $T_f$ if the channel is sensed to be idle for a total of at least 5 us with at least 4 us of sensing occurring in the sensing slot.

4.1.2.3 Type 2C DL Channel Access Procedures

When a gNB follows the procedures in this clause for transmission of a DL transmission, the gNB does not sense the channel before transmission of the DL transmission. The duration of the corresponding DL transmission is at most 584 us.

4.1.3 DL Channel Access Procedures in a Shared Channel Occupancy

For the case where an eNB shares a channel occupancy initiated by a UE, the eNB may transmit a transmission that follows an autonomous PUSCH transmission by the UE as follows:

If 'COT sharing indication' in AUL-UCI in subframe n indicates '1', an eNB may transmit a transmission in subframe n+X, where X is subframeOffsetCOT-Sharing, including PDCCH but not including PDSCH on the same channel immediately after performing Type 2A DL channel access procedures in clause 4.1.2.1, if the duration of the PDCCH is less than or equal to duration of two OFDM symbols and it shall contain at least AUL-DFI or UL grant to the UE from which the PUSCH transmission indicating COT sharing was received.

If a gNB shares a channel occupancy initiated by a UE using the channel access procedures described in clause 4.2.1.1 on a channel, the gNB may transmit a transmission that follows a UL transmission on scheduled resources or a PUSCH transmission on configured resources by the UE after a gap as follows:

The transmission shall contain transmission to the UE that initiated the channel occupancy and can include non-unicast and/or unicast transmissions where any unicast transmission that includes user plane data is only transmitted to the UE that initiated the channel occupancy.

If the higher layer parameters ul-toDL-COT-SharingED-Threshold-r16 is not provided, the transmission shall not include any unicast transmissions with user plane data and the transmission duration is not more than the duration of 2, 4 and 8 symbols for subcarrier spacing of 15, 30 and 60 kHz of the corresponding channel, respectively.

If the gap is up to 16 us, the gNB can transmit the transmission on the channel after performing Type 2C DL channel access as described in clause 4.1.2.3.

If the gap is 25 us or 16 us, the gNB can transmit the transmission on the channel after performing Type 2A or Type 2B DL channel access procedures as described in clause 4.1.2.1 and 4.1.2.2, respectively.

For the case where a gNB shares a channel occupancy initiated by a UE with configured grant PUSCH transmission, the gNB may transmit a transmission that follows the configured grant PUSCH transmission by the UE as follows:

If the higher layer parameter ul-toDL-COT-SharingED-Threshold-r16 is provided, the UE is configured by cg-COT-SharingList-r16 where cg-COT-SharingList-r16 provides a table configured by higher layer. Each row of the table provides a channel occupancy sharing information given by higher layer parameter CG-COT- Sharing-r16. One row of the table is configured for indicating that the channel occupancy sharing is not available.

If the 'COT sharing information' in CG-UCI detected in slot n indicates a row index that corresponds to a CG-COT-Sharing-r16 that provides channel occupancy sharing information, the gNB can share the UE channel occupancy assuming a channel access priority class p=channelAccessPriority-r16, starting from slot n+O, where O=offset-r16 slots, for a duration of D=duration-r16 slots where duration-r16, offset-r16, and channelAccessPriority-r16 are higher layer parameters provided by CG-COT-Sharing-r16.

If the higher layer parameter ul-toDL-COT-SharingED-Threshold-r16 is not provided, and if 'COT sharing information' in CG-UCI indicates '1', the gNB can share the UE channel occupancy and start the DL transmission X=cg-COT-SharingOffset-r16 symbols from the end of the slot where CG-UCI is detected, where cg-COT-SharingOffset-r16 is provided by higher layer. The transmission shall not include any unicast transmissions with user plane data and the transmission duration is not more than the duration of 2, 4 and 8 symbols for subcarrier spacing of 15, 30 and 60 kHz of the corresponding channel, respectively.

For the case where a gNB uses channel access procedures as described in clause 4.1.1 to initiate a transmission and shares the corresponding channel occupancy with a UE that transmits a transmission as described in clause 4.2.1.2, the gNB may transmit a transmission within its channel occupancy that follows the UE's transmission if any gap between any two transmissions in the gNB channel occupancy is at most 25 us. In this case the following applies:

If the gap is 25 us or 16 us, the gNB can transmit the transmission on the channel after performing Type 2A or 2B DL channel access procedures as described in clause 4.1.2.1 and 4.1.2.2, respectively.

If the gap is up to 16 us, the gNB can transmit the transmission on the channel after performing Type 2C DL channel access as described in clause 4.1.2.3.

4.1.4 Contention Window Adjustment Procedures

If an eNB/gNB transmits transmissions including PDSCH that are associated with channel access priority class p on a channel, the eNB/gNB maintains the contention window value $CW_p$ and adjusts $CW_p$ before step 1 of the procedure described in clause 4.1.1 for those transmissions as described in this clause.

4.1.4.1 Contention Window Adjustment Procedures for Transmissions by eNB

If an eNB transmits transmissions including PDSCH that are associated with channel access priority class p on a channel, the eNB maintains the contention window value $CW_p$ and adjusts $CW_p$ before step 1 of the procedure described in clause 4.1.1 for those transmissions using the following steps:

1) for every priority class p∈{1, 2, 3, 4} set $CW_p=CW_{min,p}$
2) if at least Z=80% of HARQ-ACK values corresponding to PDSCH transmission(s) in reference subframe k are determined as NACK, increase $CW_p$ for every priority class p∈{1, 2, 3, 4} to the next higher allowed value and remain in step 2; otherwise, go to step 1.

Reference subframe k is the starting subframe of the most recent transmission on the channel made by the eNB, for which at least some HARQ-ACK feedback is expected to be available.

The eNB shall adjust the value of $CW_p$ for every priority class p∈{1, 2, 3, 4} based on a given reference subframe k only once.

For determining Z,
if the eNB transmission(s) for which HARQ-ACK feedback is available start in the second slot of subframe k, HARQ-ACK values corresponding to PDSCH transmission(s) in subframe k+1 are also used in addition to the HARQ-ACK values corresponding to PDSCH transmission(s) in subframe k.
if the HARQ-ACK values correspond to PDSCH transmission(s) on an LAA SCell that are assigned by (E)PDCCH transmitted on the same LAA SCell,
   if no HARQ-ACK feedback is detected for a PDSCH transmission by the eNB, or if the eNB detects 'DTX', 'NACK/DTX' or 'any' state, it is counted as NACK.
if the HARQ-ACK values correspond to PDSCH transmission(s) on an LAA SCell that are assigned by (E)PDCCH transmitted on another serving cell,
   if the HARQ-ACK feedback for a PDSCH transmission is detected by the eNB, 'NACK/DTX' or 'any' state is counted as NACK, and 'DTX' state is ignored.
   if no HARQ-ACK feedback is detected for a PDSCH transmission by the eNB
      if PUCCH format 1b with channel selection is expected to be used by the UE, 'NACK/DTX' state corresponding to 'no transmission' as described in Clauses 10.1.2.2.1, 10.1.3.1 and 10.1.3.2.1 is counted as NACK, and 'DTX' state corresponding to 'no transmission' is ignored in [4].
      Otherwise, the HARQ-ACK for the PDSCH transmission is ignored.
if a PDSCH transmission has two codewords, the HARQ-ACK value of each codeword is considered separately
bundled HARQ-ACK across M subframes is considered as M HARQ-ACK responses.

If the eNB transmits transmissions including PDCCH/EPDCCH with DCI format 0A/0B/4A/4B and not including PDSCH that are associated with channel access priority class p on a channel starting from time $t_0$, the eNB maintains the contention window value $CW_p$ and adjusts $CW_p$ before step 1 of the procedure described in clause 4.1.1 for those transmissions using the following steps:

1) for every priority class p∈{1, 2, 3, 4} set $CW_p=CW_{min,p}$
2) if less than 10% of the UL transport blocks scheduled by the eNB using Type 2 channel access procedure (described in clause 4.2.1.2) in the time interval between $t_0$ and $t_0+T_{CO}$ have been received successfully, increase $CW_p$ for every priority class p∈{1, 2, 3, 4} to the next higher allowed value and remain in step 2; otherwise, go to step 1.

$T_{CO}$ is computed as described in clause 4.2.1.0.3.

4.1.4.2 Contention Window Adjustment Procedures for DL Transmissions by gNB

If a gNB transmits transmissions including PDSCH that are associated with channel access priority class p on a channel, the gNB maintains the contention window value $CW_p$ and adjusts $CW_p$ before step 1 of the procedure described in clause 4.1.1 for those transmissions using the following steps:

1) For every priority class p∈{1, 2, 3, 4}, set $CW_p=CW_{min,p}$.
2) If HARQ-ACK feedback is available after the last update of $W_p$, go to step 3. Otherwise, if the gNB transmission after procedure described in clause 4.1.1 does not include a retransmission or is transmitted within a duration $T_w$ from the end of the reference duration corresponding to the earliest DL channel occupancy after the last update of $CW_p$, go to step 5; otherwise go to step 4.
3) The HARQ-ACK feedback(s) corresponding to PDSCH(s) in the reference duration for the latest DL channel occupancy for which HARQ-ACK feedback is available is used as follows:
  a. If at least one HARQ-ACK feedback is 'ACK' for PDSCH(s) with transport block based feedback or at least 10% of HARQ-ACK feedbacks is 'ACK' for PDSCH CBGs transmitted at least partially on the channel with code block group based feedback, go to step 1; otherwise go to step 4.
4) Increase $CW_p$ for every priority class $p \in \{1, 2, 3, 4\}$ to the next higher allowed value.
5) For every priority class $p \in \{1, 2, 3, 4\}$, maintain $CW_p$ as it is; go to step 2.

The reference duration and duration $T_w$ in the procedure above are defined as follows:
  The reference duration corresponding to a channel occupancy initiated by the gNB including transmission of PDSCH(s) is defined in this clause as a duration starting from the beginning of the channel occupancy until the end of the first slot where at least one unicast PDSCH is transmitted over all the resources allocated for the PDSCH, or until the end of the first transmission burst by the gNB that contains unicast PDSCH(s) transmitted over all the resources allocated for the PDSCH, whichever occurs earlier. If the channel occupancy includes a unicast PDSCH, but it does not include any unicast PDSCH transmitted over all the resources allocated for that PDSCH, then, the duration of the first transmission burst by the gNB within the channel occupancy that contains unicast PDSCH(s) is the reference duration for CWS adjustment.
  $T_w = \max(T_A, T_B + 1 \text{ ms})$ where $T_B$ is the duration of the transmission burst from start of the reference duration in ms and $T_A = 5$ ms if the absence of any other technology sharing the channel can not be guaranteed on a long-term basis (e.g. by level of regulation), and $T_A = 10$ ms otherwise.

If a gNB transmits transmissions using Type 1 channel access procedures associated with the channel access priority class p on a channel and the transmissions are not associated with explicit HARQ-ACK feedbacks by the corresponding UE(s), the gNB adjusts $CW_p$ before step 1 in the procedures described in subclase 4.1.1, using the latest $CW_p$ used for any DL transmissions on the channel using Type 1 channel access procedures associated with the channel access priority class p. If the corresponding channel access priority class p has not been used for any DL transmissions on the channel, $CW_p = CW_{min,p}$ is used.

4.1.4.3 Common Procedures for CWS Adjustments for DL Transmissions

The following applies to the procedures described in clauses 4.1.4.1 and 4.1.4.2:
  If $CW_p = CW_{max,p}$, the next higher allowed value for adjusting $CW_p$ is $CW_{max,p}$.
  If the $CW_p = CW_{max,p}$ is consecutively used K times for generation of $N_{init}$, $CW_p$ is reset to $CW_{min,p}$ only for that priority class p p for which $CW_p = CW_{max,p}$ is consecutively used K times for generation of $N_{init}$. K is selected by eNB/gNB from the set of values $\{1, 2, \ldots, 8\}$ for each priority class $p \in \{1, 2, 3, 4\}$.

4.1.5 Energy Detection Threshold Adaptation Procedures

An eNB/gNB accessing a channel on which transmission(s) are performed, shall set the energy detection threshold ($X_{Thresh}$) to be less than or equal to the maximum energy detection threshold $X_{Thresh\_max}$.

$X_{Thresh\_max}$ is determined as follows:
  If the absence of any other technology sharing the channel can be guaranteed on a long-term basis (e.g. by level of regulation) then:

$$X_{Thresh\_max} = \min \left\{ \begin{array}{l} T_{max} + 10 \text{ dB}, \\ X_r \end{array} \right\}$$

$X_r$ is maximum energy detection threshold defined by regulatory requirements in dBm when such requirements are defined, otherwise $X_r = T_{max} + 10$ dB;

otherwise, $$X_{Thresh\_max} = \max \left\{ \begin{array}{l} -72 + 10 \cdot \log 10 (BW\text{MHz}/20 \text{ MHz}) \text{dBm}, \\ \min \left\{ \begin{array}{l} T_{max}, \\ T_{max} - T_A + (P_H + 10 \cdot \log 10 (BW\text{MHz}/20 \text{ MHz}) - P_{TX}) \end{array} \right\} \end{array} \right\}$$

where:
  $T_A = 5$ dB for transmissions including discovery burst(s) as described in clause 4.1.2, and $T_A = 10$ dB otherwise;
  $P_H = 23$ dBm;
  $P_{TX}$ is the set maximum eNB/gNB output power in dBm for the channel;
    eNB/gNB uses the set maximum transmission power over a single channel irrespective of whether single channel or multi-channel transmission is employed $$T_{max}(\text{dBm}) = 10 \cdot \log 10(3.16228 \cdot 10^{-8} (\text{mW/MHz}) \cdot BW\text{MHz}(\text{MHz}));$$

BWMHz is the single channel bandwidth in MHz.

4.1.6 Channel Access Procedures for Transmission(s) on Multiple Channels

An eNB/gNB can access multiple channels on which transmission(s) are performed, according to one of the Type A or Type B procedures described in this Clause.

4.1.6.1 Type A Multi-Channel Access Procedures

An eNB/gNB shall perform channel access on each channel $c_i \in C$, according to the procedures described in clause 4.1.1, where C is a set of channels on which the eNB/gNB intends to transmit, and $i = 0, 1, \ldots, q-1$, and q is the number of channels on which the eNB/gNB intends to transmit.

The counter N described in clause 4.1.1 is determined for each channel $c_i$ and is denoted as $N_{c_i}$. $N_{c_i}$ is maintained according to clause 4.1.6.1.1 or 4.1.6.1.2.

4.1.6.1.1 Type A1 Multi-Channel Access Procedures

Counter N as described in clause 4.1.1 is independently determined for each channel $c_i$ and is denoted as $N_{c_i}$.

If the absence of any other technology sharing the channel cannot be guaranteed on a long term basis (e.g. by level of regulation), when the eNB/gNB ceases transmission on any one channel $c_j \in C$, for each channel $c_i \neq c_j$, the eNB/gNB can resume decrementing $N_{c_i}$ when idle sensing slots are detected either after waiting for a duration of $4 \cdot T_{sl}$, or after reinitialising $N_{c_i}$.

For determining $CW_p$ for channel $c_i$, any PDSCH that fully or partially overlaps with channel $c_i$, is used in the procedures described in clause 4.1.4.2.

4.1.6.1.2 Type A2 Multi-Channel Access Procedures

Counter N is determined as described in clause 4.1.1 for channel $c_j \in C$, and is denoted as $N_{c_j}$, where $c_j$ is the channel that has the largest $CW_p$ value. For each channel $c_i$, $N_{c_i} = N_{c_j}$.

When the eNB/gNB ceases transmission on any one channel for which $N_{c_i}$ is determined, the eNB/gNB shall reinitialise $N_{c_i}$ for all channels.

For determining $CW_p$ for channel $c_i$, any PDSCH that fully or partially overlaps with channel $c_i$, is used in the procedures described in clause 4.1.4.2.

4.1.6.2 Type B Multi-Channel Access Procedure

A channel $c_j \in C$ is selected by the eNB/gNB as follows:
the eNB/gNB selects $c_j$ by uniformly randomly choosing $c_j$ from C before each transmission on multiple channels $c_i \in C$, or
the eNB/gNB selects $c_j$ no more frequently than once every 1 second,
where C is a set of channels on which the eNB/gNB intends to transmit, i=0, 1, ... q−1, and q is the number of channels on which the eNB intends to transmit.

To transmit on channel $c_j$
the eNB/gNB shall perform channel access on channel $c_j$ according to the procedures described in clause 4.1.1 with the modifications described in clause 4.1.6.2.1 or 4.1.6.2.2.

To transmit on channel $c_i \neq c_j$, $c_i \in C$
for each channel $c_i$, the eNB/gNB shall sense the channel $c_i$ for at least a sensing interval $T_{mc}$=25 us immediately before the transmitting on channel $c_j$, and the eNB/gNB may transmit on carrier $c_i$ immediately after sensing the channel $c_i$ to be idle for at least the sensing interval $T_{mc}$. The channel $c_i$ is considered to be idle for $T_{mc}$ if the channel is sensed to be idle during all the time durations in which such idle sensing is performed on the channel $c_j$ in given interval $T_{mc}$.

The eNB/gNB shall not transmit a transmission on a channel $c_i \neq c_j$, $c_i \in C$, for a period exceeding $T_{m\ cot,p}$ as given in Table 4.1.1-1, where the value of $T_{m\ cot,p}$ is determined using the channel access parameters used for channel $c_j$.

For the procedures in this clause, the channel frequencies of the set of channels C selected by gNB, is a subset of one of the sets of channel frequencies defined in [6].

4.1.6.2.1 Type B1 Multi-Channel Access Procedure

A single $CW_p$ value is maintained for the set of channels C.

For determining $CW_p$ for channel access on channel $c_j$, step 2 of the procedure described in clause 4.1.4.1 is modified as follows
if at least Z=80% of HARQ-ACK values corresponding to PDSCH transmission(s) in reference subframe k of all channels $c_i \in C$ are determined as NACK, increase $CW_p$ for each priority class $p \in \{1, 2, 3, 4\}$ to the next higher allowed value; otherwise, go to step 1.

For determining $CW_p$ for a set of channels C, any PDSCH that fully or partially overlaps with any channel $c_i \in C$, is used in the procedure described in clause 4.1.4.2.

4.1.6.2.2 Type B2 Multi-Channel Access Procedure

A $CW_p$ value is maintained independently for each channel $c_i \in C$ using the procedure described in clause 4.1.4.

For determining $CW_p$ for channel $c_i$, any PDSCH that fully or partially overlaps with channel $c_i$, is used in the procedure described in clause 4.1.4.2.

For determining $N_{init}$ for channel $c_j$, $CW_p$ value of channel $c_{j1} \in C$ is used, where $c_{j1}$ is the channel with largest $CW_p$ among all channels in set C.

4.2 Uplink Channel Access Procedures

A UE performing transmission(s) on LAA Scell(s), an eNB scheduling or configuring UL transmission(s) for a UE performing transmission(s) on LAA Scell(s), and a UE performing transmission(s) on channel(s) and a gNB scheduling or configuring UL transmission(s) for a UE performing transmissions on channel(s) shall perform the procedures described in this clause for the UE to access the channel(s) on which the transmission(s) are performed.

In this clause, transmissions from a UE are considered as separate UL transmissions, irrespective of having a gap between transmissions or not, and $X_{Thresh}$ for sensing is adjusted as described in clause 4.2.3 when applicable.

A UE performs channel access procedures in this clause unless the higher layer parameter ChannelAccessMode-r16 is provided and ChannelAccessMode-r16='semistatic'.

If a UE fails to access the channel(s) prior to an intended UL transmission to a gNB, Layer 1 notifies higher layers about the channel access failure.

4.2.1 Channel Access Procedures for Uplink Transmission(s)

A UE can access a channel on which UL transmission(s) are performed according to one of Type 1 or Type 2 UL channel access procedures. Type 1 channel access procedure is described in clause 4.2.1.1. Type 2 channel access procedure is described in clause 4.2.1.2.

If a UL grant scheduling a PUSCH transmission indicates Type 1 channel access procedures, the UE shall use Type 1 channel access procedures for transmitting transmissions including the PUSCH transmission unless stated otherwise in this clause.

A UE shall use Type 1 channel access procedures for transmitting transmissions including the autonomous or configured grant PUSCH transmission on configured UL resources unless stated otherwise in this clause.

If a UL grant scheduling a PUSCH transmission indicates Type 2 channel access procedures, the UE shall use Type 2 channel access procedures for transmitting transmissions including the PUSCH transmission unless stated otherwise in this clause.

A UE shall use Type 1 channel access procedures for transmitting SRS transmissions not including a PUSCH transmission. UL channel access priority class p=1 in Table 4.2.1-1 is used for SRS transmissions not including a PUSCH.

If a DL assignment triggering SRS but not scheduling a PUCCH transmission indicates Type 2 channel access procedures, the UE shall use Type 2 channel access procedures.

If a UE is scheduled by an eNB/gNB to transmit PUSCH and SRS in contiguous transmissions without any gaps in between, and if the UE cannot access the channel for PUSCH transmission, the UE shall attempt to make SRS transmission according to uplink channel access procedures specified for SRS transmission.

If a UE is scheduled by a gNB to transmit PUSCH and one or more SRSs by a single UL grant in non-contiguous transmissions, or a UE is scheduled by a gNB to transmit PUCCH and/or SRSs by a single DL assignment in non-contiguous transmissions, the UE shall use the channel access procedure indicated by the scheduling DCI for the first UL transmission scheduled by the scheduling DCI. If the channel is sensed by the UE to be continuously idle after the UE has stopped transmitting the first transmission, the UE may transmit further UL transmissions scheduled by the scheduling DCI using Type 2 channel access procedures or Type 2A UL channel access procedures without applying a CP extension if the further UL transmissions are within the gNB Channel Occupancy Time. Otherwise, if the channel sensed by the UE is not continuously idle after the UE has stopped transmitting the first UL transmission or the further UL transmissions are outside the gNB Channel Occupancy Time, the UE may transmit the further UL transmissions using Type 1 channel access procedure, without applying a CP extension.

A UE shall use Type 1 channel access procedures for PUCCH transmissions unless stated otherwise in this clause. If a DL grant determined according to Clause 9.2.3 in [7, TS38.213] or a random access response (RAR) message for successRAR scheduling a PUCCH transmission indicates Type 2 channel access procedures, the UE shall use Type 2 channel access procedures.

When a UE uses Type 1 channel access procedures for PUCCH transmissions or PUSCH only transmissions without UL-SCH, the UE shall use UL channel access priority class p=1 in Table 4.2.1-1.

A UE shall use Type 1 channel access procedure for PRACH transmissions and PUSCH transmissions without user plane data related to random access procedure that initiate a channel occupancy. In this case, UL channel access priority class p=1 in Table 4.2.1-1 is used for PRACH transmissions, and UL channel access priority class used for PUSCH transmissions is determined according to Clause 5.6.2 in [9].

When a UE uses Type 1 channel access procedures for PUSCH transmissions on configured resource, the UE determines the corresponding UL channel access priority p in Table 4.2.1-1 following the procedures described in Clause 5.6.2 in [9].

When a UE uses Type 1 channel access procedures for PUSCH transmissions with user plane data indicated by a UL grant or related to random access procedure where the corresponding UL channel access priority p is not indicated, the UE determines p in Table 4.2.1-1 following the same procedures as for PUSCH transmission on configured resources using Type 1 channel access procedures.

When a UE uses Type 2A, Type 2B, or Type 2C UL channel access procedures for PUSCH transmissions indicated by a UL grant or related to random access procedures where the corresponding UL channel access priority p is not indicated, the UE assumes that the channel access priority class p=4 is used by the gNB for the Channel Occupancy Time.

A UE shall not transmit on a channel for a Channel Occupancy Time that exceeds $T_{ulm\ cot,p}$ where the channel access procedure is performed based on the channel access priority class p associated with the UE transmissions, as given in Table 4.2.1-1.

The total Channel Occupancy Time of autonomous uplink transmission(s) obtained by the channel access procedure in this clause, including the following DL transmission if the UE sets 'COT sharing indication' in AUL-UCI to '1' in a subframe within the autonomous uplink transmission(s) as described in Clause 4.1.3, shall not exceed $T_{ulm\ cot,p}$, where $T_{ulm\ cot,p}$ is given in Table 4.2.1-1.

TABLE 4.2.1-1

Channel Access Priority Class (CAPC) for UL

| Channel Access Priority Class (p) | $m_p$ | $CW_{min,p}$ | $CW_{max,p}$ | $T_{ulm\ cot,p}$ | allowed $CW_p$ sizes |
|---|---|---|---|---|---|
| 1 | 2 | 3 | 7 | 2 ms | {3, 7} |
| 2 | 2 | 7 | 15 | 4 ms | {7, 15} |
| 3 | 3 | 15 | 1023 | 6 ms or 10 ms | {15, 31, 63, 127, 255, 511, 1023} |
| 4 | 7 | 15 | 1023 | 6 ms or 10 ms | {15, 31, 63, 127, 255, 511, 1023} ... |

NOTE1:
For p = 3, 4, $T_{ulm\ cot,\ p}$ = 10 ms if the higher layer parameter absenceOfAnyOtherTechnology-r14 or absenceOfAnyOtherTechnology-r16 is provided, otherwise, $T_{ulm\ cot,\ p}$ = 6 ms.
NOTE 2:
When $T_{ulm\ cot,\ p}$ = 6 ms it may be increased to 8 ms by inserting one or more gaps. The minimum duration of a gap shall be 100 us. The maximum duration before including any such gap shall be 6 ms.

4.3 Channel Access Procedures for Semi-Static Channel Occupancy

Channel assess procedures based on semi-static channel occupancy as described in this Clause, are intended for environments where the absence of other technologies is guaranteed e.g., by level of regulations, private premises policies, etc. If a gNB provides UE(s) with higher layer parameters ChannelAccessMode-r16='semistatic' by SIB1 or dedicated configuration, a periodic channel occupancy can be initiated by the gNB every $T_x$ within every two consecutive radio frames, starting from the even indexed radio frame at $i \cdot T_x$ with a maximum channel occupancy time $T_y = 0.95 T_x$, where $T_x$=period in ms, is a higher layer parameter provided in SemiStaticChannelAccessConfig and $$i \in \left\{0, 1, \ldots, \frac{20}{T_x} - 1\right\}.$$

In the following procedures in this clause, when a gNB or UE performs sensing for evaluating a channel availability, the sensing is performed at least during a sensing slot duration $T_{sl}$=9 us. The corresponding $X_{Thresh}$ adjustment for performing sensing by a gNB or a UE is described in clauses 4.1.5 and 4.2.3, respectively.

A channel occupancy initiated by a gNB and shared with UE(s) shall satisfy the following:
  The gNB shall transmit a DL transmission burst starting at the beginning of the channel occupancy time immediately after sensing the channel to be idle for at least a sensing slot duration $T_{sl}$=9 us. If the channel is sensed to be busy, the gNB shall not perform any transmission during the current period.
  The gNB may transmit a DL transmission burst(s) within the channel occupancy time immediately after sensing the channel to be idle for at least a sensing slot duration $T_{sl}$=9 us if the gap between the DL transmission burst(s) and any previous transmission burst is more than 16 us.

The gNB may transmit DL transmission burst(s) after UL transmission burst(s) within the channel occupancy time without sensing the channel if the gap between the DL and UL transmission bursts is at most 16 us.

A UE may transmit UL transmission burst(s) after detection of a DL transmission burst(s) within the channel occupancy time as follows:

If the gap between the UL and DL transmission bursts is at most 16 us, the UE may transmit UL transmission burst(s) after a DL transmission burst(s) within the channel occupancy time without sensing the channel.

If the gap between the UL and DL transmission bursts is more than 16 us, the UE may transmit UL transmission burst(s) after a DL transmission burst(s) within the channel occupancy time after sensing the channel to be idle for at least a sensing slot duration $T_{sl}$=9 us within a 25 us interval ending immediately before transmission.

The gNB and UEs shall not transmit any transmissions in a set of consecutive symbols for a duration of at least $T_z$=max(0.05$T_x$, 100 us) before the start of the next period.

If a UE fails to access the channel(s) prior to an intended UL transmission to a gNB, Layer 1 notifies higher layers about the channel access failure.

There is a study of operation in frequency band higher than 52.6 gigahertz (GHz). Some changes and/or amendments are under consideration as there are several characteristics different from lower conventional frequency bands (e.g., at least one of wider available bandwidth, larger noise such as larger phase noise, different, such as greater, intercell interference (ICI), etc.). Therefore, it may be expected that a larger subcarrier spacing (e.g., up to 960 kHz) and a bandwidth of a cell may be increased to GHz level, (e.g., 1 or 2 GHz). Alternatively and/or additionally, since there may be unlicensed spectrum in the considered frequency band, whether or not there is any change required for channel accessing scheme is under discussion. For example, there may be some cases in which a device accesses the channel and/or spectrum without LBT (e.g., No-LBT). Alternatively and/or additionally, one or more adjustments on LBT may be considered, such as directional LBT and/or receiver assistant LBT. Information related to frequency bands, LBT and/or one or more adjustments on LBT is provided in one or more parts of RP-202925 quoted below:

According to the outcome of the study item on Supporting NR above 52.6 GHz and leveraging FR2 design to the extent possible, this WI extends NR operation up to 71 GHz considering, both, licensed and unlicensed operation, with the following objectives:

Physical layer aspects including [RAN1]:
In addition to 120 kHz SCS, specify new SCS, 480 kHz and 960 kHz, and define maximum bandwidth(s), for operation in this frequency range for data and control channels and reference signals, only NCP supported.
Note: Except for timing line related aspects, a common design framework shall be adopted for 480 kHz to 960 kHz
Time line related aspects adapted to 480 kHz and 960 kHz, e.g., BWP and beam switching timing, HARQ timing, UE processing, preparation and computation timelines for PDSCH, PUSCH/SRS and CSI, respectively.
Support of up to 64 SSB beams for licensed and unlicensed operation in this frequency range.
Supports 120 kHz SCS for SSB and 120 kHz SCS for initial access related signals/channels in an initial BWP.
Study and specify, if needed, additional SCS (240 kHz, 480 kHz, 960 kHz) for SSB, and additional SCS (480 kHz, 960 kHz) for initial access related signals/channels in initial BWP.
Study and specify, if needed, additional SCS (480 kHz, 960 kHz) for SSB for cases other than initial access.
Note: coverage enhancement for SSB is not pursued.
Specify timing associated with beam-based operation to new SCS (i.e., 480 kHz and/or 960 kHz), study, and specify if needed, potential enhancement for shared spectrum operation
Study which beam management will be used as a basis: R15/16 or R17 in RAN #91-e
Support enhancement for PUCCH format 0/1/4 to increase the number of RBs under PSD limitation in shared spectrum operation.
Support enhancements for multi-PDSCH/PUSCH scheduling and HARQ support with a single DCI
Note: coverage enhancement for multi-PDSCH/PUSCH scheduling is not pursued
Support enhancement to PDCCH monitoring, including blind detection/CCE budget, and multi-slot span monitoring, potential limitation to UE PDCCH configuration and capability related to PDCCH monitoring.
Specify support for PRACH sequence lengths (i.e. L=139, L=571 and L=1151) and study, if needed, specify support for RO configuration for non-consecutive RACH occasions (RO) in time domain for operation in shared spectrum
Evaluate, and if needed, specify the PTRS enhancement for 120 kHz SCS, 480 kHz SCS and/or 960 kHz SCS, as well as DMRS enhancement for 480 kHz SCS and/or 960 kHz SCS.
Physical layer procedure(s) including [RAN1]:
Channel access mechanism assuming beam based operation in order to comply with the regulatory requirements applicable to unlicensed spectrum for frequencies between 52.6 GHz and 71 GHz.
Specify both LBT and No-LBT related procedures, and for No-LBT case no additional sensing mechanism is specified.
Study, and if needed specify, omni-directional LBT, directional LBT and receiver assistance in channel access
Study, and if needed specify, energy detection threshold enhancement A beam may be utilized for a transmission (e.g., the beam may be utilized so as to improve the transmission quality by focusing signal strength on a desired direction, such as on a direction towards the receiver). For example, utilizing beams (e.g., utilizing beams to focus signal strength on a desired direction) may improve coverage on higher frequency bands. Quasi-colocation (QCL) with type D may be used to represent utilization of beam. For example, a transmission and/or reception that is QCLed with type D with a signal may mean that the transmission and/or reception is performed with the same beam as the one used for the signal. More details on beams and/or QCL type D may be found in one or more parts of 3GPP TS 38.214 V16.4.0 quoted below:

5.1.5 Antenna Ports Quasi Co-Location

The UE can be configured with a list of up to M TCI-State configurations within the higher layer parameter PDSCH-Config to decode PDSCH according to a detected PDCCH with DCI intended for the UE and the given serving cell, where M depends on the UE capability maxNumberConfiguredTCIstatesPerCC. Each TCI-State contains parameters for configuring a quasi co-location relationship between one or two downlink reference signals and the DM-RS ports of the PDSCH, the DM-RS port of PDCCH or the CSI-RS port(s) of a CSI-RS resource. The quasi co-location relationship is configured by the higher layer parameter qcl-Type1 for the first DL RS, and qcl-Type2 for the second DL RS (if configured). For the case of two DL RSs, the QCL types shall not be the same, regardless of whether the references are to the same DL RS or different DL RSs. The quasi co-location types corresponding to each DL RS are given by the higher layer parameter qcl-Type in QCL-Info and may take one of the following values:

- 'typeA': {Doppler shift, Doppler spread, average delay, delay spread}
- 'typeB': {Doppler shift, Doppler spread}
- 'typeC': {Doppler shift, average delay}
- 'typeD': {Spatial Rx parameter}

The UE receives an activation command, as described in clause 6.1.3.14 of [10, TS 38.321], used to map up to 8 TCI states to the codepoints of the DCI field 'Transmission Configuration Indication' in one CC/DL BWP or in a set of CCs/DL BWPs, respectively. When a set of TCI state IDs are activated for a set of CCs/DL BWPs, where the applicable list of CCs is determined by indicated CC in the activation command, the same set of TCI state IDs are applied for all DL BWPs in the indicated CCs.

When a UE supports two TCI states in a codepoint of the DCI field 'Transmission Configuration Indication' the UE may receive an activation command, as described in clause 6.1.3.24 of [10, TS 38.321], the activation command is used to map up to 8 combinations of one or two TCI states to the codepoints of the DCI field 'Transmission Configuration Indication'. The UE is not expected to receive more than 8 TCI states in the activation command.

When the DCI field 'Transmission Configuration Indication' is present in DCI format 1_2 and when the number of codepoints S in the DCI field 'Transmission Configuration Indication' of DCI format 1_2 is smaller than the number of TCI codepoints that are activated by the activation command, as described in clause 6.1.3.14 and 6.1.3.24 of [10, TS38.321], only the first S activated codepoints are applied for DCI format 1_2.

When the UE would transmit a PUCCH with HARQ-ACK information in slot n corresponding to the PDSCH carrying the activation command, the indicated mapping between TCI states and codepoints of the DCI field 'Transmission Configuration Indication' should be applied starting from the first slot that is after slot $n+3N_{slot}^{subframe,\mu}$ where $\mu$ is the SCS configuration for the PUCCH. If tci-PresentInDCI is set to 'enabled' or tci-PresentDCI-1-2 is configured for the CORESET scheduling the PDSCH, and the time offset between the reception of the DL DCI and the corresponding PDSCH is equal to or greater than timeDurationForQCL if applicable, after a UE receives an initial higher layer configuration of TCI states and before reception of the activation command, the UE may assume that the DM-RS ports of PDSCH of a serving cell are quasi co-located with the SS/PBCH block determined in the initial access procedure with respect to qcl-Type set to 'typeA', and when applicable, also with respect to qcl-Type set to 'typeD'. If a UE is configured with the higher layer parameter tci-PresentInDCI that is set as 'enabled' for the CORESET scheduling the PDSCH, the UE assumes that the TCI field is present in the DCI format 1_1 of the PDCCH transmitted on the CORESET. If a UE is configured with the higher layer parameter tci-PresentDCI-1-2 for the CORESET scheduling the PDSCH, the UE assumes that the TCI field with a DCI field size indicated by tci-PresentDCI-1-2 is present in the DCI format 1_2 of the PDCCH transmitted on the CORESET. If the PDSCH is scheduled by a DCI format not having the TCI field present, and the time offset between the reception of the DL DCI and the corresponding PDSCH of a serving cell is equal to or greater than a threshold timeDurationForQCL if applicable, where the threshold is based on reported UE capability [13, TS 38.306], for determining PDSCH antenna port quasi co-location, the UE assumes that the TCI state or the QCL assumption for the PDSCH is identical to the TCI state or QCL assumption whichever is applied for the CORESET used for the PDCCH transmission within the active BWP of the serving cell.

If the PDSCH is scheduled by a DCI format having the TCI field present, the TCI field in DCI in the scheduling component carrier points to the activated TCI states in the scheduled component carrier or DL BWP, the UE shall use the TCI-State according to the value of the 'Transmission Configuration Indication' field in the detected PDCCH with DCI for determining PDSCH antenna port quasi co-location. The UE may assume that the DM-RS ports of PDSCH of a serving cell are quasi co-located with the RS(s) in the TCI state with respect to the QCL type parameter(s) given by the indicated TCI state if the time offset between the reception of the DL DCI and the corresponding PDSCH is equal to or greater than a threshold timeDurationForQCL, where the threshold is based on reported UE capability [13, TS 38.306]. When the UE is configured with a single slot PDSCH, the indicated TCI state should be based on the activated TCI states in the slot with the scheduled PDSCH. When the UE is configured with a multi-slot PDSCH, the indicated TCI state should be based on the activated TCI states in the first slot with the scheduled PDSCH, and UE shall expect the activated TCI states are the same across the slots with the scheduled PDSCH. When the UE is configured with CORESET associated with a search space set for cross-carrier scheduling and the UE is not configured with enableDefaultBeamForCCS, the UE expects tci-PresentInDCI is set as 'enabled' or tci-PresentDCI-1-2 is configured for the CORESET, and if one or more of the TCI states configured for the serving cell scheduled by the search space set contains qcl-Type set to 'typeD', the UE expects the time offset between the reception of the detected PDCCH in the search space set and the corresponding PDSCH is larger than or equal to the threshold timeDurationForQCL. Independent of the configuration of tci-PresentInDCI and tci-PresentDCI-1-2 in RRC connected mode, if the offset between the reception of the DL DCI and the corresponding PDSCH is less than the threshold timeDurationForQCL and at least one configured TCI state for the serving cell of scheduled PDSCH contains qcl-Type set to 'typeD', the UE may assume that the DM-RS ports of PDSCH of a serving cell are quasi co-located with the RS(s) with respect to the QCL parameter(s) used for PDCCH quasi co-location indication of the CORESET associated with a monitored search space with the lowest controlResourceSetId in the latest slot in which one or more CORESETs within the active BWP of the serving cell are monitored by the UE. In this case, if the qcl-Type is set to 'typeD' of the PDSCH DM-RS is different from that of the PDCCH DM-RS with which they overlap in at least one symbol, the UE is expected to prioritize the reception of PDCCH associated with that CORESET. This also applies to the intra-band CA case (when PDSCH and the CORESET are in different component carriers).

If a UE is configured with enableDefaultTCIStatePerCoresetPoolIndex and the UE is configured by higher layer parameter PDCCH-Config that contains two different values of coresetPoolIndex in different ControlResourceSets, the UE may assume that the DM-RS ports of PDSCH associated with a value of coresetPoolIndex of a serving cell are quasi co-located with the RS(s) with respect to the QCL parameter(s) used for PDCCH quasi co-location indication of the CORESET associated with a monitored search space with the lowest controlResourceSetId among CORESETs, which are configured with the same value of coresetPoolIndex as the PDCCH scheduling that PDSCH, in the latest slot in which one or more CORESETs associated with the same value of coresetPoolIndex as the PDCCH scheduling that PDSCH within the active BWP of the serving cell are monitored by the UE. In this case, if the 'QCL-TypeD' of the PDSCH DM-RS is different from that of the PDCCH DM-RS with which they overlap in at least one symbol and they are associated with same coresetPoolIndex, the UE is expected to prioritize the reception of PDCCH associated with that CORESET. This also applies to the intra-band CA case (when PDSCH and the CORESET are in different component carriers).

If a UE is configured with enableTwoDefaultTCI-States, and at least one TCI codepoint indicates two TCI states, the UE may assume that the DM-RS ports of PDSCH or PDSCH transmission occasions of a serving cell are quasi co-located with the RS(s) with respect to the QCL parameter(s) associated with the TCI states corresponding to the lowest codepoint among the TCI codepoints containing two different TCI states. When the UE is configured by higher layer parameter repetitionScheme set to 'tdmSchemeA' or is configured with higher layer parameter repetitionNumber, the mapping of the TCI states to PDSCH transmission occasions is determined according to clause 5.1.2.1 by replacing the indicated TCI states with the TCI states corresponding to the lowest codepoint among the TCI codepoints containing two different TCI states based on the activated TCI states in the slot with the first PDSCH transmission occasion. In this case, if the 'QCL-TypeD' in both of the TCI states corresponding to the lowest codepoint among the TCI codepoints containing two different TCI states is different from that of the PDCCH DM-RS with which they overlap in at least one symbol, the UE is expected to prioritize the reception of PDCCH associated with that CORESET. This also applies to the intra-band CA case (when PDSCH and the CORESET are in different component carriers)

In all cases above, if none of configured TCI states for the serving cell of scheduled PDSCH is configured with qcl-Type set to 'typeD', the UE shall obtain the other QCL assumptions from the indicated TCI states for its scheduled PDSCH irrespective of the time offset between the reception of the DL DCI and the corresponding PDSCH.

If the PDCCH carrying the scheduling DCI is received on one component carrier, and the PDSCH scheduled by that DCI is on another component carrier and the UE is configured with enableDefaultBeam-ForCCS:

The timeDurationForQCL is determined based on the subcarrier spacing of the scheduled PDSCH. If $\mu_{PDCCH} < \mu_{PDSCH}$ an additional timing delay $$d \frac{2^{\mu_{PDSCH}}}{2^{\mu_{PDCCH}}}$$

is added to the timeDurationForQCL, where d is defined in 5.2.1.5.1a-1, otherwise d is zero;

For both the cases, when the offset between the reception of the DL DCI and the corresponding PDSCH is less than the threshold timeDurationForQCL, and when the DL DCI does not have the TCI field present, the UE obtains its QCL assumption for the scheduled PDSCH from the activated TCI state with the lowest ID applicable to PDSCH in the active BWP of the scheduled cell.

For a periodic CSI-RS resource in an NZP-CSI-RS-ResourceSet configured with higher layer parameter trs-Info, the UE shall expect that a TCI-State indicates one of the following quasi co-location type(s):
  'typeC' with an SS/PBCH block and, when applicable, 'typeD' with the same SS/PBCH block, or
  'typeC' with an SS/PBCH block and, when applicable, 'typeD' with a CSI-RS resource in an NZP-CSI-RS-ResourceSet configured with higher layer parameter repetition, or For an aperiodic CSI-RS resource in an NZP-CSI-RS-ResourceSet configured with higher layer parameter trs-Info, the UE shall expect that a TCI-State indicates qcl-Type set to 'typeA' with a periodic CSI-RS resource in a NZP-CSI-RS-ResourceSet configured with higher layer parameter trs-Info and, when applicable, qcl-Type set to 'typeD' with the same periodic CSI-RS resource. For a CSI-RS resource in an NZP-CSI-RS-ResourceSet configured without higher layer parameter trs-Info and without the higher layer parameter repetition, the UE shall expect that a TCI-State indicates one of the following quasi co-location type(s):
  'typeA' with a CSI-RS resource in a NZP-CSI-RS-ResourceSet configured with higher layer parameter trs-Info and, when applicable, 'typeD' with the same CSI-RS resource, or
  'typeA' with a CSI-RS resource in a NZP-CSI-RS-ResourceSet configured with higher layer parameter trs-Info and, when applicable, 'typeD' with an SS/PBCH block, or
  'typeA' with a CSI-RS resource in a NZP-CSI-RS-ResourceSet configured with higher layer parameter trs-Info and, when applicable, 'typeD' with a CSI-RS resource in a NZP-CSI-RS-ResourceSet configured with higher layer parameter repetition, or
  'typeB' with a CSI-RS resource in a NZP-CSI-RS-ResourceSet configured with higher layer parameter trs-Info when 'typeD' is not applicable.

For a CSI-RS resource in an NZP-CSI-RS-ResourceSet configured with higher layer parameter repetition, the UE shall expect that a TCI-State indicates one of the following quasi co-location type(s):
  'typeA' with a CSI-RS resource in a NZP-CSI-RS-ResourceSet configured with higher layer parameter trs-Info and, when applicable, 'typeD' with the same CSI-RS resource, or 'typeA' with a CSI-RS resource in a NZP-CSI-RS-ResourceSet configured with higher layer parameter trs-Info and, when applicable, 'typeD' with a CSI-RS resource in a NZP-CSI-RS-ResourceSet configured with higher layer parameter repetition, or 'typeC' with an SS/PBCH block and, when applicable, 'typeD' with the same SS/PBCH block.

For the DM-RS of PDCCH, the UE shall expect that a TCI-State indicates one of the following quasi co-location type(s):

'typeA' with a CSI-RS resource in a NZP-CSI-RS-ResourceSet configured with higher layer parameter trs-Info and, when applicable, 'typeD' with the same CSI-RS resource, or 'typeA' with a CSI-RS resource in a NZP-CSI-RS-ResourceSet configured with higher layer parameter trs-Info and, when applicable, 'typeD' with a CSI-RS resource in an NZP-CSI-RS-ResourceSet configured with higher layer parameter repetition, or 'typeA' with a CSI-RS resource in a NZP-CSI-RS-ResourceSet configured without higher layer parameter trs-Info and without higher layer parameter repetition and, when applicable, 'typeD' with the same CSI-RS resource.

For the DM-RS of PDSCH, the UE shall expect that a TCI-State indicates one of the following quasi co-location type(s):

'typeA' with a CSI-RS resource in a NZP-CSI-RS-ResourceSet configured with higher layer parameter trs-Info and, when applicable, 'typeD' with the same CSI-RS resource, or 'typeA' with a CSI-RS resource in a NZP-CSI-RS-ResourceSet configured with higher layer parameter trs-Info and, when applicable, 'typeD' with a CSI-RS resource in an NZP-CSI-RS-ResourceSet configured with higher layer parameter repetition, or 'typeA' with a CSI-RS resource in a NZP-CSI-RS-ResourceSet configured without higher layer parameter trs-Info and without higher layer parameter repetition and, when applicable, 'typeD' with the same CSI-RS resource.

As discussed above, there may be at least two channel access modes (e.g., Listen Before Talk (LBT) and No-LBT) for at least some frequency bands (e.g., higher frequency bands, such as frequency bands higher than 52.6 gigahertz (GHz)). There may be different types of LBT, such as at least one of omni-directional LBT, directional LBT, receiver-assistant LBT, etc. There may be tradeoffs between the different types of LBT and/or channel access modes (e.g., the at least two channel access modes). For example, No-LBT mode may reduce latency of a transmission so as to result in benefits in terms of throughput. For example, the reduced latency and/or the throughput benefits may be provided when there is no collision between the transmission and one or more other transmissions (e.g., there is no collision of the transmission with one or more other transmissions from one receiver perspective, such as where the transmission is transmitted to one receiver and does not collide with one or more other transmissions transmitted to the one receiver). On the other hand, LBT may be a better choice if transmissions (e.g., transmissions to one receiver) were to collide with each other resulting in decoding failure (e.g., decoding failure from one receiver perspective, such as where the one receiver to which the transmissions are transmitted is not able to successfully decode the transmissions due to collision of the transmissions with each other). There may be one or more criteria for a device to properly determine (e.g., judge) whether or not to perform LBT and/or how to perform LBT. For example, based on the one or more criteria and/or using one or more of the techniques herein, the device may determine whether to perform LBT channel access mode or to perform No-LBT channel access mode for a transmission, and/or the UE may determine (in response to determining to perform LBT channel access mode for the transmission, for example) which type of LBT (e.g., at least one of omni-directional LBT, directional LBT, receiver-assistant LBT, etc.) to perform for the transmission.

A concept of the present disclosure is determining whether or not to perform LBT for a transmission and/or how to perform LBT for a transmission based on one or more properties of the transmission. For example, based on the one or more properties, the device may determine whether or not to perform LBT for the transmission, and/or the UE may determine (in response to determining to perform LBT for the transmission, for example) which type of LBT (e.g., at least one of omni-directional LBT, directional LBT, receiver-assistant LBT, etc.) to perform for the transmission. The one or more properties may comprise whether or not the transmission is transmitted with a beam. The one or more properties may comprise a beam width associated with the transmission (e.g., a beam width of a beam used for the transmission). The one or more properties may comprise a Quasi-colocation (QCL) property. The one or more properties may comprise a reference signal QCLed with the transmission. The QCL may be associated with QCL type D.

In some examples, the device determines whether or not to perform LBT for the transmission based on one or more first properties of the transmission.

In an example (e.g., an example in which the one or more first properties comprise whether or not a transmission is transmitted with a beam), the device determines whether or not to perform LBT for a transmission based on whether or not the transmission is transmitted with a beam. For example, the device may perform LBT for a transmission if (and/or when and/or based on a determination that) the transmission is not transmitted with a beam. Alternatively and/or additionally, the device may not perform LBT for a transmission if (and/or when and/or based on a determination that) the transmission is transmitted with a beam.

In an example (e.g., an example in which the one or more first properties comprise a beam width associated with a transmission), the device determines whether or not to perform LBT for a transmission based on whether a beam associated with the transmission (e.g., a beam used to perform the transmission) is a wide beam or a narrow beam. For example, the device may perform LBT for a transmission if (and/or when and/or based on a determination that) the transmission is transmitted with a wide beam (e.g., a beam wider than a threshold, such as a threshold beam width). Alternatively and/or additionally, the device may not perform LBT for a transmission if (and/or when and/or based on a determination that) the transmission is transmitted with a narrow beam (e.g., a beam narrower than a threshold, such as the threshold beam width).

In an example (e.g., an example in which the one or more first properties comprise a number of antennas associated with a transmission), the device determines whether or not to perform LBT for a transmission based on whether a number of antennas associated with the transmission is greater than a threshold or less than a threshold. For example, the device may perform LBT for a transmission if (and/or when and/or based on a determination that) the transmission is transmitted with antennas amounting to a number of antennas less than a threshold (e.g., a threshold number of antennas). Alternatively and/or additionally, the device may not perform LBT for a transmission if (and/or when and/or based on a determination that) the transmission is transmitted with antennas amounting to a number of antennas greater than a threshold (e.g., the threshold number of antennas).

In an example (e.g., an example in which the one or more first properties comprise whether or not a transmission is QCLed with a reference signal with QCL type D), the device determines whether or not to perform LBT for a transmission based on whether or not a transmission is QCLed with a reference signal with QCL type D. For example, the device may perform LBT for a transmission if (and/or when and/or based on a determination that) the transmission is not QCLed with a reference signal with QCL type D. Alternatively and/or additionally, the device may not perform LBT for a transmission if (and/or when and/or based on a determination that) the transmission is QCLed with a reference signal with QCL type D.

In an example (e.g., an example in which the one or more first properties comprise a signal with which a transmission is QCLed), the device determines whether or not to perform LBT for a transmission based on a signal with which the transmission is QCLed. For example, the device may perform LBT for a transmission if (and/or when and/or based on a determination that) the transmission is QCLed with a first signal. The first signal may be a first Synchronization Signal Block (SSB). Herein, "SSB" may refer to Synchronization Signal/Physical Broadcast Channel (PBCH) Block. The first signal may be a first Channel State Information Reference Signal (CSI-RS). Alternatively and/or additionally, the device may not perform LBT for a transmission if (and/or when and/or based on a determination that) the transmission is QCLed with a second signal. The second signal may be a second CSI-RS. The second signal may be a second SSB. Which signal (e.g., the first signal and/or one or more first signals comprising the first signal) is associated with LBT (e.g., LBT channel-access mode) and/or which signal (e.g., the second signal and/or one or more second signals comprising the second signal) is associated with No-LBT (e.g., No-LBT channel-access mode) may be predefined and/or indicated (e.g., an indication that the one or more first signals are associated with LBT and/or that the one or more second signals are associated with No-LBT may be received by the device).

In some examples, the device determines how to perform LBT for a transmission based on one or more second properties of the transmission. For example, the determination of how to perform LBT for a transmission may correspond to a determination of a type of LBT to perform for the transmission and/or a determination of a value of a LBT parameter to use for performing LBT for the transmission. In some examples, the determination of how to perform LBT for a transmission may be performed in response to (and/or after) a determination to perform LBT for the transmission. Alternatively and/or additionally, the determination of how to perform LBT for a transmission may be performed concurrently (or before) a determination to perform LBT for the transmission. In an example, the device determines whether to perform a first type of LBT or a second type of LBT for a transmission based on the one or more second properties of the transmission.

In an example (e.g., an example in which the one or more second properties comprise whether or not a transmission is transmitted with a beam), the device determines a type of LBT (e.g., the first type of LBT or the second type of LBT) to perform for a transmission based on whether or not the transmission is transmitted with a beam. For example, the device may perform the first type of LBT for a transmission if (and/or when and/or based on a determination that) the transmission is not transmitted with a beam. Alternatively and/or additionally, the device may perform a second type of LBT for a transmission if (and/or when and/or based on a determination that) the transmission is transmitted with a beam.

In an example (e.g., an example in which the one or more second properties comprise a beam width associated with a transmission), the device determines a type of LBT (e.g., the first type of LBT or the second type of LBT) to perform for a transmission based on whether a beam associated with the transmission is a wide beam or the beam is a narrow beam. For example, the device may perform the first type of LBT for a transmission if (and/or when and/or based on a determination that) the transmission is transmitted with a wide beam (e.g., a beam wider than a threshold, such as a threshold beam width). Alternatively and/or additionally, the device may perform the second type of LBT for a transmission if (and/or when and/or based on a determination that) the transmission is transmitted with a narrow beam (e.g., a beam narrower than a threshold, such as the threshold beam width).

In an example (e.g., an example in which the one or more second properties comprise a number of antennas associated with a transmission), the device determines a type of LBT (e.g., the first type of LBT or the second type of LBT) to perform for a transmission based on whether a number of antennas associated with the transmission is greater than a threshold or less than a threshold. For example, the device may perform the first type of LBT for a transmission if (and/or when and/or based on a determination that) the transmission is transmitted with antennas amounting to a number of antennas less than a threshold (e.g., a threshold number of antennas). Alternatively and/or additionally, the device may perform the second type of LBT for a transmission if (and/or when and/or based on a determination that) the transmission is transmitted with antennas amounting to a number of antennas greater than a threshold (e.g., the threshold number of antennas).

In an example (e.g., an example in which the one or more second properties comprise whether or not a transmission is QCLed with a reference signal with QCL type D), the device determines a type of LBT (e.g., the first type of LBT or the second type of LBT) to perform for a transmission based on whether or not the transmission is QCLed with a reference signal with QCL type D. For example, the device may perform the first type of LBT for a transmission if (and/or when and/or based on a determination that) the transmission is not QCLed with a reference signal with QCL type D. Alternatively and/or additionally, the device may perform the second type of LBT for a transmission if (and/or when and/or based on a determination that) the transmission is QCLed with a reference signal with QCL type D.

In an example (e.g., an example in which the one or more second properties comprise a signal with which a transmission is QCLed), the device determines a type of LBT (e.g., the first type of LBT or the second type of LBT) to perform for a transmission based on a signal with which the transmission is QCLed. For example, the device may perform the first type of LBT for a transmission if (and/or when and/or based on a determination that) the transmission is QCLed with a first signal. The first signal may be a first SSB. The first signal may be a first CSI-RS. Alternatively and/or additionally, the device may perform the second type of LBT for a transmission if (and/or when and/or based on a determination that) the transmission is QCLed with a second signal. The second signal may be a second CSI-RS. The second signal may be a second SSB. Which signal (e.g., the first signal and/or one or more first signals comprising the first signal) is associated with the first type of LBT and/or which signal (e.g., the second signal and/or one or more second signals comprising the second signal) is associated with the second type of LBT may be predefined and/or indicated (e.g., an indication that the one or more first signals are associated with the first type of LBT and/or that the one or more second signals are associated with the second type of LBT may be received by the device).

The first type of LBT may be omni-directional LBT. Alternatively and/or additionally, the first type of LBT may be directional LBT. Alternatively and/or additionally, the first type of LBT may be receiver-assistant LBT. The second type of LBT may be omni-directional LBT. Alternatively and/or additionally, the second type of LBT may be directional LBT. Alternatively and/or additionally, the second type of LBT may be receiver-assistant LBT.

In some examples, different types of LBT may be associated with different values of one or more LBT parameters. In an example, the first type of LBT may be associated with a first value of a LBT parameter. The second type of LBT may be associated with a second value of the LBT parameter. The LBT parameter may be a threshold (e.g., an energy detection threshold) for LBT. Alternatively and/or additionally, the LBT parameter may be a window size (e.g., a contention window size) for LBT.

In some examples, the first type of LBT is different than the second type of LBT. In an example, the first type of LBT may be omni-directional LBT and the second type of LBT may be directional LBT or receiver-assistant LBT. In an example, the first type of LBT may be directional LBT and the second type of LBT may be omni-directional LBT or receiver-assistant LBT. In an example, the first type of LBT may be receiver-assistant LBT and the second type of LBT may be omni-directional LBT or directional LBT. In an example, both the first type of LBT and the second type of LBT may be omni-directional LBT, wherein a first value of a LBT parameter of the first type of LBT is different than a second value of a LBT parameter of the second type of LBT. In an example, both the first type of LBT and the second type of LBT may be directional LBT, wherein a first value of a LBT parameter of the first type of LBT is different than a second value of a LBT parameter of the second type of LBT. In an example, both the first type of LBT and the second type of LBT may be receiver-assistant LBT, wherein a first value of a LBT parameter of the first type of LBT is different than a second value of a LBT parameter of the second type of LBT.

With respect to one or more embodiments provided herein, such as examples provided above, the device may be a base station. Alternatively and/or additionally, the device may be a UE.

With respect to one or more embodiments provided herein, such as examples provided above, the transmission may be a Physical Uplink Shared Channel (PUSCH) transmission. Alternatively and/or additionally, the transmission may be a Physical Uplink Control Channel (PUCCH) transmission. Alternatively and/or additionally, the transmission may be a Physical Random Access Channel (PRACH) transmission. Alternatively and/or additionally, the transmission may be a Sounding Reference Signal (SRS) transmission. Alternatively and/or additionally, the transmission may be a Physical Downlink Control Channel (PDCCH) transmission. Alternatively and/or additionally, the transmission may be a Physical Downlink Shared Channel (PDSCH) transmission. Alternatively and/or additionally, the transmission may be a CSI-RS transmission. Alternatively and/or additionally, the transmission may be a Non-Zero Power (NZP)-CSI-RS transmission. Alternatively and/or additionally, the transmission may be a Zero Power (ZP)-CSI-RS transmission. Alternatively and/or additionally, the transmission may be a Demodulation Reference Signal (DM-RS) transmission. Alternatively and/or additionally, the transmission may be a SSB transmission. Alternatively and/or additionally, the transmission may be a unicast transmission. Alternatively and/or additionally, the transmission may be unicast PDCCH scheduling user plane data (e.g., the transmission is a unicast PDCCH transmission of scheduling information that schedules user plane data). Alternatively and/or additionally, the transmission may be a transmission scheduled by PDCCH. Alternatively and/or additionally, the transmission may be unicast PDSCH with user plane data (e.g., the transmission is a unicast PDSCH transmission comprising transmission of the user plane data). Alternatively and/or additionally, the transmission may be a discovery burst transmission.

In an example, the first type of LBT may be a downlink (DL) channel access procedure. Alternatively and/or additionally, the first type of LBT may be a type 1 DL channel access procedure. Alternatively and/or additionally, the first type of LBT may be a type 2 DL channel access procedure. Alternatively and/or additionally, the first type of LBT may be a type 2A DL channel access procedure. Alternatively and/or additionally, the first type of LBT may be a type 2B DL channel access procedure. Alternatively and/or additionally, the first type of LBT may be a type 2C DL channel access procedure. Alternatively and/or additionally, the first type of LBT may be a type A multi-channel access procedure. Alternatively and/or additionally, the first type of LBT may be a type A1 multi-channel access procedure. Alternatively and/or additionally, the first type of LBT may be a type A2 multi-channel access procedure. Alternatively and/or additionally, the first type of LBT may be a type B multi-channel access procedure. Alternatively and/or additionally, the first type of LBT may be a type B1 multi-channel access procedure. Alternatively and/or additionally, the first type of LBT may be a type B2 multi-channel access procedure. Alternatively and/or additionally, the first type of LBT may be an uplink (UL) channel access procedure. Alternatively and/or additionally, the first type of LBT may be a type 1 UL channel access procedure. Alternatively and/or additionally, the first type of LBT may be a type 2 UL channel access procedure. Alternatively and/or additionally, the first type of LBT may be a type 2A UL channel access procedure. Alternatively and/or additionally, the first type of LBT may be a type 2B UL channel access procedure. Alternatively and/or additionally, the first type of LBT may be a type 2C UL channel access procedure.

In an example, the second type of LBT may be a DL channel access procedure. Alternatively and/or additionally, the second type of LBT may be a type 1 DL channel access procedure. Alternatively and/or additionally, the second type of LBT may be a type 2 DL channel access procedure. Alternatively and/or additionally, the second type of LBT may be a type 2A DL channel access procedure. Alternatively and/or additionally, the second type of LBT may be a type 2B DL channel access procedure. Alternatively and/or additionally, the second type of LBT may be a type 2C DL channel access procedure. Alternatively and/or additionally, the second type of LBT may be a type A multi-channel access procedure. Alternatively and/or additionally, the second type of LBT may be a type A1 multi-channel access procedure. Alternatively and/or additionally, the second type of LBT may be a type A2 multi-channel access procedure. Alternatively and/or additionally, the second type of LBT may be a type B multi-channel access procedure. Alternatively and/or additionally, the second type of LBT may be a type B1 multi-channel access procedure. Alternatively and/or additionally, the second type of LBT may be a type B2 multi-channel access procedure. Alternatively and/or additionally, the second type of LBT may be an UL channel access procedure. Alternatively and/or additionally, the second type of LBT may be a type 1 UL channel access procedure. Alternatively and/or additionally, the second type of LBT may be a type 2 UL channel access procedure. Alternatively and/or additionally, the second type of LBT may be a type 2A UL channel access procedure. Alternatively and/or additionally, the second type of LBT may be a type 2B UL channel access procedure. Alternatively and/or additionally, the second type of LBT may be a type 2C UL channel access procedure.

In a first embodiment, a UE determines whether or not to perform LBT for a transmission and/or how to perform LBT for the transmission based on one or more properties of the transmission, wherein the one or more properties comprise whether or not the transmission is performed with a beam. For example, based on whether or not the transmission is performed with a beam, the UE may determine whether or not to perform LBT for the transmission, and/or the UE may determine (in response to determining to perform LBT for the transmission, for example) which type of LBT (e.g., at least one of omni-directional LBT, directional LBT, receiver-assistant LBT, a first type of LBT, a second type of LBT, LBT with a first value of a LBT parameter, LBT with a second value of a LBT parameter, etc.) to perform for the transmission.

In an example, the UE may perform LBT for a transmission if (and/or when and/or based on a determination that) the transmission is not performed with a beam (e.g., the transmission is an omni-directional transmission). The UE may not perform LBT for a transmission (e.g., the UE may perform the transmission directly without LBT) if (and/or when and/or based on a determination that) the transmission is performed with a beam (e.g., the transmission is a directional transmission).

In an example, the UE may perform a first type of LBT for a transmission if (and/or when and/or based on a determination that) the transmission is not performed with a beam (e.g., the transmission is an omni-directional transmission). The UE may perform a second type of LBT for a transmission if (and/or when and/or based on a determination that) the transmission is performed with a beam (e.g., the transmission is a directional transmission). The first type of LBT may be different than the second type of LBT.

In an example, the UE may perform LBT, for a transmission, with a first value for a LBT parameter of the LBT if (and/or when and/or based on a determination that) the transmission is performed with a beam (e.g., the transmission is a directional transmission). The UE may perform LBT, for a transmission, with a second value for a LBT parameter of the LBT if (and/or when and/or based on a determination that) the transmission is not performed with a beam (e.g., the transmission is an omni-directional transmission). The first value may be different than the second value.

In a second embodiment, a base station determines whether or not to perform LBT for a transmission and/or how to perform LBT for the transmission based on one or more properties of the transmission, wherein the one or more properties comprise whether or not the transmission is performed with a beam. For example, based on whether or not the transmission is performed with a beam, the base station may determine whether or not to perform LBT for the transmission, and/or the base station may determine (in response to determining to perform LBT for the transmission, for example) which type of LBT (e.g., at least one of omni-directional LBT, directional LBT, receiver-assistant LBT, a first type of LBT, a second type of LBT, LBT with a first value of a LBT parameter, LBT with a second value of a LBT parameter, etc.) to perform for the transmission.

In an example, the base station may perform LBT for a transmission if (and/or when and/or based on a determination that) the transmission is not performed with a beam (e.g., the transmission is an omni-directional transmission). The base station may not perform LBT for a transmission if (and/or when and/or based on a determination that) the transmission is performed with a beam (e.g., the transmission is a directional transmission).

In an example, the base station may perform a first type of LBT for a transmission if (and/or when and/or based on a determination that) the transmission is not performed with a beam (e.g., the transmission is an omni-directional transmission). The base station may perform a second type of LBT for a transmission if (and/or when and/or based on a determination that) the transmission is performed with a beam (e.g., the transmission is a directional transmission). The first type of LBT may be different than the second type of LBT.

In an example, the base station may perform LBT, for a transmission, with a first value for a LBT parameter of the LBT if (and/or when and/or based on a determination that) the transmission is performed with a beam (e.g., the transmission is a directional transmission). The base station may perform LBT, for a transmission, with a second value for a LBT parameter of the LBT if (and/or when and/or based on a determination that) the transmission is not performed with a beam (e.g., the transmission is an omni-directional transmission). The first value may be different than the second value.

In a third embodiment, a UE determines whether or not to perform LBT for a transmission and/or how to perform LBT for the transmission based on one or more properties of the transmission, wherein the one or more properties comprise a beam width of the transmission. For example, based on the beam width of the transmission, the UE may determine whether or not to perform LBT for the transmission, and/or the UE may determine (in response to determining to perform LBT for the transmission, for example) which type of LBT (e.g., at least one of omni-directional LBT, directional LBT, receiver-assistant LBT, a first type of LBT, a second type of LBT, LBT with a first value of a LBT parameter, LBT with a second value of a LBT parameter, etc.) to perform for the transmission.

In an example, the UE may perform LBT for a transmission if (and/or when and/or based on a determination that) a beam width of the transmission is a first value (e.g., a first beam width). The UE may not perform LBT for a transmission if (and/or when and/or based on a determination that) a beam width of the transmission is a second value (e.g., a second beam width).

In an example, the UE may perform LBT for a transmission if (and/or when and/or based on a determination that) a beam width of the transmission is larger than a threshold (e.g., a threshold beam width, such as 30 degrees or a different value). The UE may not perform LBT for a transmission if (and/or when and/or based on a determination that) a beam width of the transmission is smaller than a threshold (e.g., the threshold beam width, such as 30 degrees or a different value).

In an example, the UE may perform a first type of LBT for a transmission if (and/or when and/or based on a determination that) a beam width of the transmission is a first value (e.g., a first beam width). The UE may perform a second type of LBT for a transmission if (and/or when and/or based on a determination that) a beam width of the transmission is a second value (e.g., a second beam width).

In an example, the UE may perform a first type of LBT for a transmission if (and/or when and/or based on a determination that) a beam width of the transmission is larger than a threshold (e.g., a threshold beam width). The UE may perform a second type of LBT for a transmission if (and/or when and/or based on a determination that) a beam width of the transmission is smaller than a threshold (e.g., the threshold beam width).

In an example, the UE may perform LBT, for a transmission, with a first parameter value for a LBT parameter of the LBT if (and/or when and/or based on a determination that) a beam width of the transmission is a first value (e.g., a first beam width). The UE may perform LBT, for a transmission, with a second parameter value for a LBT parameter of the LBT if (and/or when and/or based on a determination that) a beam width of the transmission is a second value (e.g., a second beam width).

In an example, the UE may perform LBT, for a transmission, with a first value for a LBT parameter of the LBT if (and/or when and/or based on a determination that) a beam width of the transmission is larger than a threshold (e.g., a threshold beam width). The UE may perform LBT, for a transmission, with a second value for a LBT parameter of the LBT if (and/or when and/or based on a determination that) a beam width of the transmission is smaller than a threshold (e.g., the threshold beam width).

In examples provided with respect to the third embodiment, a beam width of a transmission may correspond to a beam width of a beam of the transmission (e.g., a beam width of a beam used to perform the transmission).

In a fourth embodiment, a base station determines whether or not to perform LBT for a transmission and/or how to perform LBT for the transmission based on one or more properties of the transmission, wherein the one or more properties comprise a beam width of the transmission. For example, based on the beam width of the transmission, the base station may determine whether or not to perform LBT for the transmission, and/or the base station may determine (in response to determining to perform LBT for the transmission, for example) which type of LBT (e.g., at least one of omni-directional LBT, directional LBT, receiver-assistant LBT, a first type of LBT, a second type of LBT, LBT with a first value of a LBT parameter, LBT with a second value of a LBT parameter, etc.) to perform for the transmission.

In an example, the base station may perform LBT for a transmission if (and/or when and/or based on a determination that) a beam width of the transmission is a first value (e.g., a first beam width). The base station may not perform LBT for a transmission if (and/or when and/or based on a determination that) a beam width of the transmission is a second value (e.g., a second beam width).

In an example, the base station may perform LBT for a transmission if (and/or when and/or based on a determination that) a beam width of the transmission is larger than a threshold (e.g., a threshold beam width, such as 30 degrees or a different value). The base station may not perform LBT for a transmission if (and/or when and/or based on a determination that) a beam width of the transmission is smaller than a threshold (e.g., the threshold beam width, such as 30 degrees or a different value).

In an example, the base station may perform a first type of LBT for a transmission if (and/or when and/or based on a determination that) a beam width of the transmission is a first value (e.g., a first beam width). The base station may perform a second type of LBT for a transmission if (and/or when and/or based on a determination that) a beam width of the transmission is a second value (e.g., a second beam width).

In an example, the base station may perform a first type of LBT for a transmission if (and/or when and/or based on a determination that) a beam width of the transmission is larger than a threshold (e.g., a threshold beam width). The base station may perform a second type of LBT for a transmission if (and/or when and/or based on a determination that) a beam width of the transmission is smaller than a threshold (e.g., the threshold beam width).

In an example, the base station may perform LBT, for a transmission, with a first parameter value for a LBT parameter of the LBT if (and/or when and/or based on a determination that) a beam width of the transmission is a first value (e.g., a first beam width). The base station may perform LBT, for a transmission, with a second parameter value for a LBT parameter of the LBT if (and/or when and/or based on a determination that) a beam width of the transmission is a second value (e.g., a second beam width).

In an example, the base station may perform LBT, for a transmission, with a first value for a LBT parameter of the LBT if (and/or when and/or based on a determination that) a beam width of the transmission is larger than a threshold (e.g., a threshold beam width). The base station may perform LBT, for a transmission, with a second value for a LBT parameter of the LBT if (and/or when and/or based on a determination that) a beam width of the transmission is smaller than a threshold (e.g., the threshold beam width).

In examples provided with respect to the fourth embodiment, a beam width of a transmission may correspond to a beam width of a beam of the transmission (e.g., a beam width of a beam used to perform the transmission).

In a fifth embodiment, a UE determines whether or not to perform LBT for a transmission and/or how to perform LBT for the transmission based on one or more properties of the transmission, wherein the one or more properties comprise a number of antennas utilized for the transmission. For example, based on the number of antennas of the transmission, the UE may determine whether or not to perform LBT for the transmission, and/or the UE may determine (in response to determining to perform LBT for the transmission, for example) which type of LBT (e.g., at least one of omni-directional LBT, directional LBT, receiver-assistant LBT, a first type of LBT, a second type of LBT, LBT with a first value of a LBT parameter, LBT with a second value of a LBT parameter, etc.) to perform for the transmission.

In an example, the UE may perform LBT for a transmission if (and/or when and/or based on a determination that) a number of antennas utilized for the transmission is a first value (e.g., a first number of antennas). The UE may not perform LBT for a transmission if (and/or when and/or based on a determination that) a number of antennas utilized for the transmission is a second value (e.g., a second number of antennas).

In an example, the UE may perform LBT for a transmission if (and/or when and/or based on a determination that) a number of antennas utilized for the transmission is less than a threshold (e.g., a threshold number of antennas, such as 64 antennas or a different value). The UE may not perform LBT for a transmission if (and/or when and/or based on a determination that) a number of antennas utilized for the transmission is greater than a threshold (e.g., the threshold number of antennas, such as 64 antennas or a different value).

In an example, the UE may perform a first type of LBT for a transmission if (and/or when and/or based on a determination that) a number of antennas utilized for the transmission is a first value (e.g., a first number of antennas). The UE may perform a second type of LBT for a transmission if (and/or when and/or based on a determination that) a number of antennas utilized for the transmission is a second value (e.g., a second number of antennas).

In an example, the UE may perform a first type of LBT for a transmission if (and/or when and/or based on a determination that) a number of antennas utilized for the transmission is less than a threshold (e.g., a threshold number of antennas). The UE may perform a second type of LBT for a transmission if (and/or when and/or based on a determination that) a number of antennas utilized for the transmission is greater than a threshold (e.g., the threshold number of antennas).

In an example, the UE may perform LBT, for a transmission, with a first parameter value for a LBT parameter of the LBT if (and/or when and/or based on a determination that) a number of antennas utilized for the transmission is a first value. The UE may perform LBT, for a transmission, with a second parameter value for a LBT parameter of the LBT if (and/or when and/or based on a determination that) a number of antennas utilized for the transmission is a second value.

In an example, the UE may perform LBT, for a transmission, with a first value for a LBT parameter of the LBT if (and/or when and/or based on a determination that) a number of antennas utilized for the transmission is less than a threshold (e.g., a threshold number of antennas). The UE may perform LBT, for a transmission, with a second value for a LBT parameter of the LBT if (and/or when and/or based on a determination that) a number of antennas utilized for the transmission is greater than a threshold (e.g., the threshold number of antennas).

In a sixth embodiment, a base station determines whether or not to perform LBT for a transmission and/or how to perform LBT for the transmission based on one or more properties of the transmission, wherein the one or more properties comprise a number of antennas utilized for the transmission. For example, based on the number of antennas of the transmission, the base station may determine whether or not to perform LBT for the transmission, and/or the base station may determine (in response to determining to perform LBT for the transmission, for example) which type of LBT (e.g., at least one of omni-directional LBT, directional LBT, receiver-assistant LBT, a first type of LBT, a second type of LBT, LBT with a first value of a LBT parameter, LBT with a second value of a LBT parameter, etc.) to perform for the transmission.

In an example, the base station may perform LBT for a transmission if (and/or when and/or based on a determination that) a number of antennas utilized for the transmission is a first value (e.g., a first number of antennas). The base station may not perform LBT for a transmission if (and/or when and/or based on a determination that) a number of antennas utilized for the transmission is a second value (e.g., a second number of antennas).

In an example, the base station may perform LBT for a transmission if (and/or when and/or based on a determination that) a number of antennas utilized for the transmission is less than a threshold (e.g., a threshold number of antennas, such as 64 antennas or a different value). The base station may not perform LBT for a transmission if (and/or when and/or based on a determination that) a number of antennas utilized for the transmission is greater than a threshold (e.g., the threshold number of antennas, such as 64 antennas or a different value).

In an example, the base station may perform a first type of LBT for a transmission if (and/or when and/or based on a determination that) a number of antennas utilized for the transmission is a first value (e.g., a first number of antennas). The base station may perform a second type of LBT for a transmission if (and/or when and/or based on a determination that) a number of antennas utilized for the transmission is a second value (e.g., a second number of antennas).

In an example, the base station may perform a first type of LBT for a transmission if (and/or when and/or based on a determination that) a number of antennas utilized for the transmission is less than a threshold (e.g., a threshold number of antennas). The base station may perform a second type of LBT for a transmission if (and/or when and/or based on a determination that) a number of antennas utilized for the transmission is greater than a threshold (e.g., the threshold number of antennas).

In an example, the base station may perform LBT, for a transmission, with a first parameter value for a LBT parameter of the LBT if (and/or when and/or based on a determination that) a number of antennas utilized for the transmission is a first value. The base station may perform LBT, for a transmission, with a second parameter value for a LBT parameter of the LBT if (and/or when and/or based on a determination that) a number of antennas utilized for the transmission is a second value.

In an example, the base station may perform LBT, for a transmission, with a first value for a LBT parameter of the LBT if (and/or when and/or based on a determination that) a number of antennas utilized for the transmission is less than a threshold (e.g., a threshold number of antennas). The base station may perform LBT, for a transmission, with a second value for a LBT parameter of the LBT if (and/or when and/or based on a determination that) a number of antennas utilized for the transmission is greater than a threshold (e.g., the threshold number of antennas).

In a seventh embodiment, a UE determines whether or not to perform LBT for a transmission and/or how to perform LBT for the transmission based on one or more properties of the transmission, wherein the one or more properties comprise a signal QCLed with the transmission and/or a type of the signal QCLed with the transmission. For example, based on the signal QCLed with the transmission and/or the type of signal, the UE may determine whether or not to perform LBT for the transmission, and/or the UE may determine (in response to determining to perform LBT for the transmission, for example) which type of LBT (e.g., at least one of omni-directional LBT, directional LBT, receiver-assistant LBT, a first type of LBT, a second type of LBT, LBT with a first value of a LBT parameter, LBT with a second value of a LBT parameter, etc.) to perform for the transmission.

In an example, the UE may perform LBT for a transmission if (and/or when and/or based on a determination that) a signal QCLed with the transmission is a first signal. The UE may not perform LBT for a transmission if (and/or when and/or based on a determination that) a signal QCLed with the transmission is a second signal.

In an example, the UE may perform LBT for a transmission if (and/or when and/or based on a determination that) a type of signal QCLed with the transmission is a first type. The UE may not perform LBT for a transmission if (and/or when and/or based on a determination that) a type of signal QCLed with the transmission is a second type.

In an example, the UE may perform a first type of LBT for a transmission if (and/or when and/or based on a determination that) a signal QCLed with the transmission is a first signal. The UE may perform a second type of LBT for a transmission if (and/or when and/or based on a determination that) a signal QCLed with the transmission is a second signal.

In an example, the UE may perform a first type of LBT for a transmission if (and/or when and/or based on a determination that) a type of signal QCLed with the transmission is a first type. The UE may perform a second type of LBT for a transmission if (and/or when and/or based on a determination that) a type of signal QCLed with the transmission is a second type.

In an example, the UE may perform LBT, for a transmission, with a first value for a LBT parameter of the LBT if (and/or when and/or based on a determination that) a signal QCLed with the transmission is a first signal. The UE may perform LBT, for a transmission, with a second value for a LBT parameter of the LBT if (and/or when and/or based on a determination that) a signal QCLed with the transmission is a second signal.

In an example, the UE may perform LBT, for a transmission, with a first value for a LBT parameter of the LBT if (and/or when and/or based on a determination that) a type of signal QCLed with the transmission is a first type. The UE may perform LBT, for a transmission, with a second value for a LBT parameter of the LBT if (and/or when and/or based on a determination that) a type of signal QCLed with the transmission is a second type.

In examples provided with respect to the seventh embodiment, the first signal may be a SSB. Alternatively and/or additionally, the first signal may be a CSI-RS. Alternatively and/or additionally, the second signal may be a SSB. Alternatively and/or additionally, the second signal may be a CSI-RS. In some examples, the UE receives, from a base station, an indication of which signal is (and/or belongs to) the first signal (e.g., the indication is indicative of the first signal). In some examples, the UE receives, from a base station, an indication of which signal is (and/or belongs to) the second signal (e.g., the indication is indicative of the second signal). There may be a rule (e.g., a predefined rule) to determine which signal is (and/or belongs to) the first signal and/or which signal is (and/or belongs to) the second signal (e.g., the UE and/or a base station may determine whether a signal is the first signal or the second signal based on the rule).

In examples provided with respect to the seventh embodiment, the first type of signal may be SSB. Alternatively and/or additionally, the first type of signal may be CSI-RS. Alternatively and/or additionally, the second type of signal may be SSB. Alternatively and/or additionally, the second type of signal may be CSI-RS. In some examples, the UE receives, from a base station, an indication of the first type of signal. In some examples, the UE receives, from a base station, an indication of the second type of signal. There may be a rule (e.g., a predefined rule) to determine the first type of signal and/or the second type of signal (e.g., the UE and/or a base station may determine whether a signal is the first type of signal or the second type of signal based on the rule).

In an eighth embodiment, a base station determines whether or not to perform LBT for a transmission and/or how to perform LBT for the transmission based on one or more properties of the transmission, wherein the one or more properties comprise a signal QCLed with the transmission and/or a type of the signal QCLed with the transmission. For example, based on the signal QCLed with the transmission and/or the type of signal, the base station may determine whether or not to perform LBT for the transmission, and/or the base station may determine (in response to determining to perform LBT for the transmission, for example) which type of LBT (e.g., at least one of omni-directional LBT, directional LBT, receiver-assistant LBT, a first type of LBT, a second type of LBT, LBT with a first value of a LBT parameter, LBT with a second value of a LBT parameter, etc.) to perform for the transmission.

In an example, the base station may perform LBT for a transmission if (and/or when and/or based on a determination that) a signal QCLed with the transmission is a first signal. The base station may not perform LBT for a transmission if (and/or when and/or based on a determination that) a signal QCLed with the transmission is a second signal.

In an example, the base station may perform LBT for a transmission if (and/or when and/or based on a determination that) a type of signal QCLed with the transmission is a first type. The base station may not perform LBT for a transmission if (and/or when and/or based on a determination that) a type of signal QCLed with the transmission is a second type.

In an example, the base station may perform a first type of LBT for a transmission if (and/or when and/or based on a determination that) a signal QCLed with the transmission is a first signal. The base station may perform a second type of LBT for a transmission if (and/or when and/or based on a determination that) a signal QCLed with the transmission is a second signal.

In an example, the base station may perform a first type of LBT for a transmission if (and/or when and/or based on a determination that) a type of signal QCLed with the transmission is a first type. The base station may perform a second type of LBT for a transmission if (and/or when and/or based on a determination that) a type of signal QCLed with the transmission is a second type.

In an example, the base station may perform LBT, for a transmission, with a first value for a LBT parameter of the LBT if (and/or when and/or based on a determination that) a signal QCLed with the transmission is a first signal. The base station may perform LBT, for a transmission, with a second value for a LBT parameter of the LBT if (and/or when and/or based on a determination that) a signal QCLed with the transmission is a second signal.

In an example, the base station may perform LBT, for a transmission, with a first value for a LBT parameter of the LBT if (and/or when and/or based on a determination that) a type of signal QCLed with the transmission is a first type. The base station may perform LBT, for a transmission, with a second value for a LBT parameter of the LBT if (and/or when and/or based on a determination that) a type of signal QCLed with the transmission is a second type.

In examples provided with respect to the eighth embodiment, the first signal may be a SSB. Alternatively and/or additionally, the first signal may be a CSI-RS. Alternatively and/or additionally, the second signal may be a SSB. The second signal may be a signal other than CSI-RS. Alternatively and/or additionally, the second signal may be a CSI-RS. Alternatively and/or additionally, the second signal may be a signal other than SSB. Alternatively and/or additionally, the second signal may be PDCCH. Alternatively and/or additionally, the second signal may be PDSCH. In some examples, the base station indicates, to a UE, which signal is (and/or belongs to) the first signal (e.g., the base station transmits, to the UE, an indication that is indicative of the first signal). In some examples, a signal that is not the first signal (and/or a signal that does not belong to the first signal) may be the second signal (e.g., it may be determined that a signal is the second signal based on a determination that the signal is not the first signal). In some examples, the base station indicates, to a UE, which signal is (and/or belongs to) the second signal (e.g., the base station transmits, to the UE, an indication that is indicative of the second signal). There may be a rule (e.g., a predefined rule) to determine which signal is (and/or belongs to) the first signal and/or which signal is (and/or belongs to) the second signal (e.g., the base station and/or a UE may determine whether a signal is the first signal or the second signal based on the rule).

In examples provided with respect to the eighth embodiment, the first type of signal may be SSB. Alternatively and/or additionally, the first type of signal may be CSI-RS. Alternatively and/or additionally, the second type of signal may be SSB. Alternatively and/or additionally, the second type of signal may be CSI-RS. In some examples, the base station indicates, to a UE, the first type of signal (e.g., the base station transmits an indication of the first type of signal to the UE). In some examples, the base station indicates, to a UE, the second type of signal (e.g., the base station transmits an indication of the second type of signal to the UE). There may be a rule (e.g., a predefined rule) to determine the first type of signal and/or the second type of signal (e.g., the base station and/or a UE may determine whether a signal is the first type of signal or the second type of signal based on the rule).

In some examples, the base station does not perform LBT for a SSB. Alternatively and/or additionally, the base station may perform LBT for a signal other than SSB (e.g., the signal other than SSB may be CSI-RS, PDCCH and/or PDSCH). Alternatively and/or additionally, the base station may not perform LBT for a signal if (and/or when and/or based on a determination that) the signal is SSB. Alternatively and/or additionally, the base station may perform LBT for a signal if (and/or when and/or based on a determination that) the signal is not SSB. Alternatively and/or additionally, the base station may perform LBT for a signal if (and/or when and/or based on a determination that) the signal is CSI-RS.

In some examples, the base station does not perform LBT for a transmission if (and/or when and/or based on a determination that) the transmission is QCLed with a SSB. Alternatively and/or additionally, the base station may perform LBT for a transmission if (and/or when and/or based on a determination that) the transmission is QCLed with a signal other than SSB (e.g., the signal other than SSB may be CSI-RS, PDCCH and/or PDSCH). Alternatively and/or additionally, the base station may not perform LBT for a transmission that is QCLed with a signal if (and/or when and/or based on a determination that) the signal is SSB. Alternatively and/or additionally, the base station may perform LBT for a transmission that is QCLed with a signal if (and/or when and/or based on a determination that) the signal is not SSB. Alternatively and/or additionally, the base station may perform LBT for a transmission that is QCLed with a signal if (and/or when and/or based on a determination that) the signal is CSI-RS.

In some examples, the base station does not perform LBT for a transmission if (and/or when and/or based on a determination that) the transmission comprises transmission of a SSB. Alternatively and/or additionally, the base station may perform LBT for a transmission if (and/or when and/or based on a determination that) the transmission comprises transmission of a signal other than SSB (e.g., the signal other than SSB may be CSI-RS, PDCCH and/or PDSCH). Alternatively and/or additionally, the base station may not perform LBT for a transmission that comprises transmission of a signal if (and/or when and/or based on a determination that) the signal is SSB. Alternatively and/or additionally, the base station may perform LBT for a transmission that comprises transmission of a signal if (and/or when and/or based on a determination that) the signal is not SSB. Alternatively and/or additionally, the base station may perform LBT for a transmission that comprises transmission of a signal if (and/or when and/or based on a determination that) the signal is CSI-RS.

One, some and/or all of the foregoing techniques and/or embodiments can be formed to a new embodiment.

In some examples, embodiments disclosed herein, such as embodiments described with respect to the first embodiment, the second embodiment, the third embodiment, the fourth embodiment, the fifth embodiment, the sixth embodiment, the seventh embodiment and the eighth embodiment, may be implemented independently and/or separately. Alternatively and/or additionally, a combination of embodiments described herein, such as embodiments described with respect to the first embodiment, the second embodiment, the third embodiment, the fourth embodiment, the fifth embodiment, the sixth embodiment, the seventh embodiment and/or the eighth embodiment, may be implemented. Alternatively and/or additionally, a combination of embodiments described herein, such as embodiments described with respect to the first embodiment, the second embodiment, the third embodiment, the fourth embodiment, the fifth embodiment, the sixth embodiment, the seventh embodiment and/or the eighth embodiment, may be implemented concurrently and/or simultaneously.

Various techniques, embodiments, methods and/or alternatives of the present disclosure may be performed independently and/or separately from one another. Alternatively and/or additionally, various techniques, embodiments, methods and/or alternatives of the present disclosure may be combined and/or implemented using a single system. Alternatively and/or additionally, various techniques, embodiments, methods and/or alternatives of the present disclosure may be implemented concurrently and/or simultaneously.

With respect to one or more embodiments herein, such as one or more embodiments provided with respect to the first embodiment, the second embodiment, the third embodiment, the fourth embodiment, the fifth embodiment, the sixth embodiment, the seventh embodiment, the eighth embodiment and/or other embodiments of the present disclosure, in an example in which a device (e.g., the UE and/or the base station) performs a type of LBT (e.g., the first type of LBT and/or the second type of LBT), the device may perform LBT according to the type of LBT (e.g., if the type of LBT corresponds to omni-directional LBT, the device may perform omni-directional LBT).

With respect to one or more embodiments herein, in some examples, the first type of LBT is different than the second type of LBT.

With respect to one or more embodiments herein, in some examples, the first value for a LBT parameter is different than the second value for a LBT parameter.

With respect to one or more embodiments herein, in an example in which a device (e.g., the UE and/or the base station) performs LBT, for a transmission, with a value (e.g., the first value and/or the second value) for a LBT parameter of the LBT, the device performs the LBT with the LBT parameter set to the value. In an example in which the device performs LBT, for a transmission, with the first value for a LBT parameter of the LBT, the device performs the LBT with the LBT parameter set to the first value. Alternatively and/or additionally, in an example in which the device performs LBT, for a transmission, with the second value for a LBT parameter of the LBT, the device performs the LBT with the LBT parameter set to the second value. In an example in which the LBT parameter is energy detection threshold and the device performs LBT, for a transmission, with the first value for the LBT parameter of the LBT, the device performs the LBT with the energy detection threshold set to the first value. Alternatively and/or additionally, in an example in which the LBT parameter is energy detection threshold and the device performs LBT, for a transmission, with the second value for a LBT parameter of the LBT, the device performs the LBT with the energy detection threshold set to the second value. In an example in which the LBT parameter is a window size (e.g., a contention window size) and the device performs LBT, for a transmission, with the first value for the LBT parameter of the LBT, the device performs the LBT with the window size set to the first value. Alternatively and/or additionally, in an example in which the LBT parameter is a window size (e.g., a contention window size) and the device performs LBT, for a transmission, with the second value for a LBT parameter of the LBT, the device performs the LBT with the window size set to the second value.

With respect to one or more embodiments herein, in an example in which a device (e.g., the UE and/or the base station) determines to perform LBT for a transmission (and/or performs LBT for the transmission), the LBT may be performed (by the device) prior to performing the transmission. Alternatively and/or additionally, performing the LBT for the transmission may comprise determining whether or not a channel and/or a spectrum (on which the transmission is to be performed, for example) are available for utilization. In an example, performing the LBT (and/or determining whether or not the channel and/or the spectrum are available for utilization) may comprise detecting presence or absence of one or more signals on the channel and/or the spectrum. The device may determine that the channel and/or the spectrum are available for utilization based on detecting absence of one or more signals on the channel and/or the spectrum (e.g., detecting silence of the channel and/or the spectrum). Detecting absence of one or more signals on the channel and/or the spectrum may comprise detecting no signal on the channel and/or the spectrum. Alternatively and/or additionally, detecting absence of one or more signals on the channel and/or the spectrum may comprise detecting one or more signals, on the channel and/or the spectrum, with one or more strength levels that are less than a threshold strength level (e.g., an energy detection threshold). The device may determine that the channel and/or the spectrum are not available for utilization based on detecting presence of one or more signals (e.g., one or more signals with one or more strength levels that exceed a threshold strength level, such as the energy detection threshold) on the channel and/or the spectrum. The device may perform the transmission upon and/or after determining that the channel and/or the spectrum are silent and/or are available for utilization. In an example, the device may perform the transmission upon and/or after determining that the channel and/or the spectrum are silent and/or are available for utilization for a period of time (e.g., the period of time may be based on, such as equal to, a window size of the LBT, such as a contention window size of the LBT). In an example in which it is determined that the channel and/or the spectrum are not available for utilization, the device may delay the transmission (e.g., the transmission may be delayed to upon and/or after a time in which the device determines that the channel and/or the spectrum are available for utilization).

With respect to one or more embodiments herein, in an example in which a device (e.g., the UE and/or the base station) determines not to perform LBT for a transmission (and/or does not perform LBT for the transmission), the device may perform the transmission without performing LBT. Alternatively and/or additionally, the transmission may be performed without determining whether or not a channel and/or a spectrum (on which the transmission is performed, for example) is available for utilization. Alternatively and/or additionally, the transmission (and/or a time at which the transmission is performed) may not be based on a determination of whether or not a channel and/or a spectrum (on which the transmission is performed, for example) is available for utilization. Alternatively and/or additionally, sensing may not be performed on a channel and/or a spectrum (on which the transmission is performed, for example) to determine whether or not to perform the transmission. Alternatively and/or additionally, the device may not attempt to detect presence of one or more signals on a channel and/or a spectrum (on which the transmission is performed, for example) to determine whether or not to delay the transmission.

Throughout the present disclosure, LBT may be replaced with a channel access scheme.

Throughout the present disclosure, LBT may be replaced with a channel access mechanism.

The present disclosure may describe behavior and/or operation of a single serving cell unless otherwise noted. Techniques and/or systems provided herein may be applicable to behavior and/or operation of a single serving cell. Techniques and/or systems provided herein may be implemented on a single serving cell.

The present disclosure may describe behavior and/or operation of multiple serving cells unless otherwise noted. Techniques and/or systems provided herein may be applicable to behavior and/or operation of multiple serving cells. Techniques and/or systems provided herein may be implemented on multiple serving cells.

The present disclosure may describe behavior and/or operation of a single bandwidth part unless otherwise noted. Techniques and/or systems provided herein may be applicable to behavior and/or operation of a single bandwidth part. Techniques and/or systems provided herein may be implemented on a single bandwidth part.

Throughout the present disclosure, a base station may configure multiple bandwidth parts to the UE (e.g., the base station configures the UE with multiple bandwidth parts) unless otherwise noted.

Throughout the present disclosure, a base station may configure a single bandwidth part to the UE (e.g., the base station configures the UE with a single bandwidth part) unless otherwise noted.

FIG. 6 is a flow chart 600 according to one exemplary embodiment from the perspective of a UE. In step 605, the UE determines whether or not to perform LBT for a first transmission and/or how to perform LBT for the first transmission based on one or more properties of the first transmission. In an example, in step 605, based on the one or more properties of the first transmission, the UE may determine whether or not to perform LBT for the first transmission, and/or the UE may determine (in response to determining to perform LBT for the first transmission, for example) which type of LBT (e.g., at least one of omni-directional LBT, directional LBT, receiver-assistant LBT, a first type of LBT, a second type of LBT, LBT with a first value of a LBT parameter, LBT with a second value of a LBT parameter, etc.) to perform for the first transmission.

Referring back to FIGS. 3 and 4, in one exemplary embodiment of a UE, the device 300 includes a program code 312 stored in the memory 310. The CPU 308 may execute program code 312 to enable the UE to determine whether or not to perform LBT for a first transmission and/or how to perform LBT for the first transmission based on one or more properties of the first transmission. Furthermore, the CPU 308 can execute the program code 312 to perform one, some and/or all of the above-described actions and steps and/or others described herein.

FIG. 7 is a flow chart 700 according to one exemplary embodiment from the perspective of a base station. In step 705, the base station determines whether or not to perform LBT for a first transmission and/or how to perform LBT for the first transmission based on one or more properties of the first transmission. In an example, in step 705, based on the one or more properties of the first transmission, the base station may determine whether or not to perform LBT for the first transmission, and/or the base station may determine (in response to determining to perform LBT for the first transmission, for example) which type of LBT (e.g., at least one of omni-directional LBT, directional LBT, receiver-assistant LBT, a first type of LBT, a second type of LBT, LBT with a first value of a LBT parameter, LBT with a second value of a LBT parameter, etc.) to perform for the first transmission.

Referring back to FIGS. 3 and 4, in one exemplary embodiment of a base station, the device 300 includes a program code 312 stored in the memory 310. The CPU 308 may execute program code 312 to enable the base station to determine whether or not to perform LBT for a first transmission and/or how to perform LBT for the first transmission based on one or more properties of the first transmission. Furthermore, the CPU 308 can execute the program code 312 to perform one, some and/or all of the above-described actions and steps and/or others described herein.

With respect to FIGS. 6-7, in one embodiment, the one or more properties of the first transmission comprise whether or not the first transmission is transmitted with a beam.

In one embodiment, the one or more properties of the first transmission comprise a beam width associated with the first transmission (e.g., a beam width for the first transmission). In an example, the beam width associated with the first transmission corresponds to a beam width of a beam used to perform the first transmission.

In one embodiment, the one or more properties of the first transmission comprise a number of antennas utilized for the first transmission (e.g., a number of antennas with which the first transmission is performed).

In one embodiment, the one or more properties of the first transmission comprise a QCL property.

In one embodiment, the one or more properties of the first transmission comprise a signal QCLed with the first transmission.

In one embodiment, the one or more properties of the first transmission comprise a type of signal QCLed with the first transmission.

In one embodiment, determining whether or not to perform LBT for the first transmission comprises determining to perform LBT for the first transmission based on a determination that the first transmission is not performed with a beam (e.g., a determination that the first transmission is an omni-directional transmission). For example, based on the determination that the first transmission is not performed with a beam, LBT may be performed for the first transmission.

In one embodiment, LBT is performed for a transmission if the transmission is not performed with a beam.

In one embodiment, determining whether or not to perform LBT for the first transmission comprises determining not to perform LBT for the first transmission based on a determination that the first transmission is performed with a beam (e.g., a determination that the first transmission is a directional transmission). For example, based on the determination that the first transmission is performed with a beam, LBT may not be performed for the first transmission (e.g., the first transmission may be performed without LBT).

In one embodiment, LBT is not performed for a transmission if the transmission is performed with a beam.

In one embodiment, determining whether or not to perform LBT for the first transmission comprises determining to perform LBT for the first transmission based on a determination that the first transmission is performed with a beam having a beam width larger than a threshold (e.g., a threshold beam width). For example, based on the determination that the first transmission is performed with a beam having a beam width larger than the threshold, LBT may be performed for the first transmission.

In one embodiment, LBT is performed for a transmission if the transmission is performed with a beam having a beam width that is larger than a threshold (e.g., a threshold beam width).

In one embodiment, determining whether or not to perform LBT for the first transmission comprises determining not to perform LBT for the first transmission based on a determination that the first transmission is performed with a beam having a beam width smaller than a threshold (e.g., a threshold beam width). For example, based on the determination that the first transmission is performed with a beam having a beam width smaller than the threshold, LBT may not be performed for the first transmission (e.g., the first transmission may be performed without LBT).

In one embodiment, LBT is not performed for a transmission if the transmission is performed with a beam having a beam width that is smaller than a threshold (e.g., a threshold beam width).

In one embodiment, determining whether or not to perform LBT for the first transmission comprises determining to perform LBT for the first transmission based on a determination that a number of antennas utilized for the first transmission is less than a threshold (e.g., a threshold number of antennas). For example, based on the determination that a number of antennas utilized for the first transmission is less than the threshold, LBT may be performed for the first transmission.

In one embodiment, LBT is performed for a transmission if a number of antennas utilized for the transmission is less than a threshold (e.g., a threshold number of antennas).

In one embodiment, determining whether or not to perform LBT for the first transmission comprises determining not to perform LBT for the first transmission based on a determination that a number of antennas utilized for the first transmission is greater than a threshold (e.g., a threshold number of antennas). For example, based on the determination that a number of antennas utilized for the first transmission is greater than the threshold, LBT may not be performed for the first transmission (e.g., the first transmission may be performed without LBT).

In one embodiment, LBT is not performed for a transmission if a number of antennas utilized for the transmission is greater than a threshold (e.g., a threshold number of antennas).

In one embodiment, determining whether or not to perform LBT for the first transmission comprises determining to perform LBT for the first transmission based on a determination that a signal QCLed with the first transmission is a first signal (and/or a first type of signal). For example, based on the determination that a signal QCLed with the first transmission is the first signal (and/or the first type of signal), LBT may be performed for the first transmission.

In one embodiment, LBT is performed for a transmission if a signal QCLed with the transmission is a first signal (and/or a first type of signal).

In one embodiment, determining whether or not to perform LBT for the first transmission comprises determining not to perform LBT for the first transmission based on a determination that a signal QCLed with the first transmission is a second signal (and/or a second type of signal). For example, based on the determination that a signal QCLed with the first transmission is the second signal (and/or the second type of signal), LBT may not be performed for the first transmission (e.g., the first transmission may be performed without LBT).

In one embodiment, LBT is not performed for a transmission if a signal QCLed with the transmission is a second signal (and/or a second type of signal).

In one embodiment, the first signal is different than the second signal.

In one embodiment, the first type of signal is different than the second type of signal.

In one embodiment, determining whether or not to perform LBT for the first transmission comprises determining to perform LBT for the first transmission based on a determination that a signal QCLed with the first transmission is SSB. For example, based on the determination that a signal QCLed with the first transmission is SSB, LBT may be performed for the first transmission.

In one embodiment, LBT is performed for a transmission if a signal QCLed with the transmission is SSB.

In one embodiment, determining whether or not to perform LBT for the first transmission comprises determining not to perform LBT for the first transmission based on a determination that a signal QCLed with the first transmission is CSI-RS. For example, based on the determination that a signal QCLed with the first transmission is CSI-RS, LBT may not be performed for the first transmission (e.g., the first transmission may be performed without LBT).

In one embodiment, LBT is not performed for a transmission if a signal QCLed with the transmission is CSI-RS.

Figure 8:
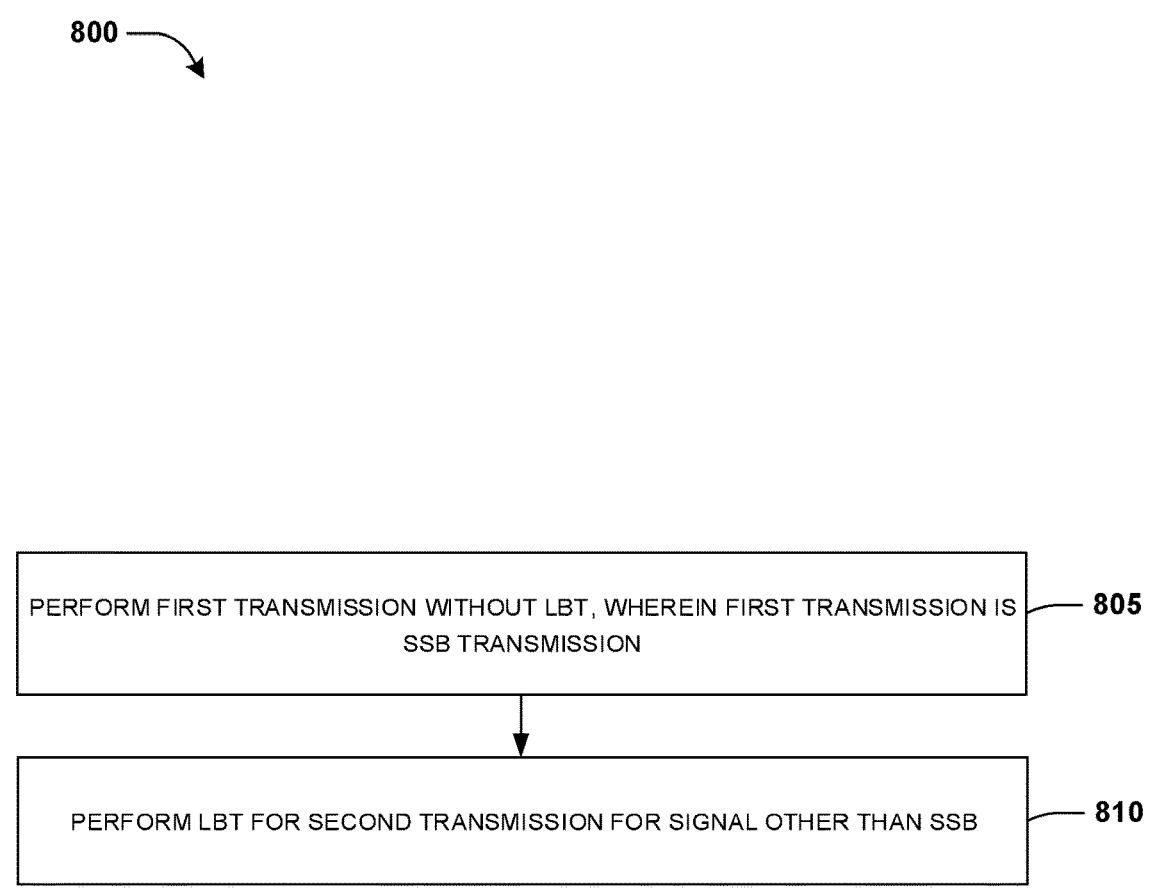
FIG. 8 is a flow chart according to one exemplary embodiment.

FIG. 8 is a flow chart 800 according to one exemplary embodiment from the perspective of a base station. In step 805, the base station performs a first transmission without LBT, wherein the first transmission is a SSB transmission (e.g., the first transmission comprises transmission of a SSB). For example, the base station does not perform LBT for the first transmission. In an example, the base station may perform the first transmission without performing LBT to determine whether or not a channel and/or a spectrum (on which the first transmission is performed, for example) is available for utilization. Alternatively and/or additionally, the first transmission (and/or a time at which the base station performs the first transmission) may not be based on LBT and/or may not be based on a determination of whether or not a channel and/or a spectrum (on which the first transmission is performed, for example) is available for utilization. Alternatively and/or additionally, the base station may not attempt to detect presence of one or more signals on a channel and/or a spectrum (on which the first transmission is performed, for example) to determine whether or not to delay the first transmission. In step 810, the base station performs LBT for a second transmission for a signal other than SSB (e.g., the signal other than SSB does not comprise a SSB and the second transmission does not comprise transmission of a SSB). In an example, the base station performs the second transmission (e.g., the second transmission comprises transmitting the signal other than SSB).

In an example, the LBT for the second transmission is performed prior to performing the second transmission. In an example, performing the LBT for the second transmission comprises determining whether or not a channel and/or a spectrum (on which the second transmission is to be performed, for example) are available for utilization. In an example, performing the LBT (and/or determining whether or not the channel and/or the spectrum are available for utilization) may comprise detecting presence or absence of one or more signals on the channel and/or the spectrum. The base station may determine that the channel and/or the spectrum are available for utilization based on detecting absence of one or more signals on the channel and/or the spectrum (e.g., detecting silence of the channel and/or the spectrum). Detecting absence of one or more signals on the channel and/or the spectrum may comprise detecting no signal on the channel and/or the spectrum. Alternatively and/or additionally, detecting absence of one or more signals on the channel and/or the spectrum may comprise detecting one or more signals, on the channel and/or the spectrum, with one or more strength levels that are less than a threshold strength level. The base station may determine that the channel and/or the spectrum are not available for utilization based on detecting presence of one or more signals (e.g., one or more signals with one or more strength levels that exceed a threshold strength level) on the channel and/or the spectrum. The base station may perform the second transmission upon and/or after determining that the channel and/or the spectrum are available for utilization. In an example in which it is determined that the channel and/or the spectrum are not available for utilization, the base station may delay the second transmission (e.g., the second transmission may be delayed to upon and/or after a time in which the base station determines that the channel and/or the spectrum are available for utilization).

In one embodiment, the signal other than SSB is a CSI-RS. In an example, the second transmission comprises transmission of the CSI-RS. In an example, the CSI-RS is NZP-CSI-RS or ZP-CSI-RS.

In one embodiment, the signal other than SSB is a PDCCH (e.g., a PDCCH signal). In an example, the PDCCH is unicast PDCCH scheduling user plane data (e.g., a unicast PDCCH signal comprising scheduling information that schedules user plane data). In an example, the second transmission comprises transmission of the PDCCH.

In one embodiment, the signal other than SSB is a PDSCH (e.g., a PDSCH signal). In an example, the second transmission comprises transmission of the PDSCH.

In one embodiment, the base station operates in a shared spectrum (e.g., an unlicensed spectrum). In an example, the base station performs the first transmission and the second transmission in the shared spectrum.

In one embodiment, the base station determines whether or not to perform LBT for a transmission based on whether or not the transmission is a SSB transmission (e.g., based on whether or not the transmission comprises transmission of a SSB). In an example, the base station may determine to perform LBT for a transmission based on a determination that the transmission is not a SSB transmission (e.g., the transmission comprises transmission of a signal other than a SSB and/or the transmission does not comprise transmission of a SSB). In an example, the base station may determine not to perform LBT for a transmission based on a determination that the transmission is a SSB transmission (e.g., the transmission comprises transmission of a SSB).

In one embodiment, the base station performs a transmission without LBT if the transmission is a SSB transmission (e.g., if the transmission comprises transmission of a SSB).

In one embodiment, the base station performs the first transmission without LBT based on the first transmission being a SSB transmission (e.g., the base station performs the first transmission without LBT based on the first transmission comprising transmission of a SSB).

In one embodiment, the base station performs LBT for a transmission if the transmission is not a SSB transmission (e.g., if the transmission does not comprise transmission of a SSB).

In one embodiment, the base station performs LBT for a transmission if the transmission is a PDCCH transmission. In an example, the PDCCH of the PDCCH transmission is unicast PDCCH scheduling user plane data (e.g., the PDCCH transmission is a unicast PDCCH transmission of scheduling information that schedules user plane data).

In one embodiment, the base station performs LBT for a transmission if the transmission is a CSI-RS transmission. In an example, the CSI-RS is NZP-CSI-RS or ZP-CSI-RS.

In one embodiment, the base station performs LBT for the second transmission based on the second transmission not being a SSB transmission (e.g., the base station performs LBT for the second transmission based on the second transmission not comprising transmission of a SSB).

In one embodiment, the base station performs LBT for the second transmission based on the transmission being a PDCCH transmission. In an example, the PDCCH of the PDCCH transmission is unicast PDCCH scheduling user plane data (e.g., the PDCCH transmission is a unicast PDCCH transmission of scheduling information that schedules user plane data).

In one embodiment, the base station performs LBT for the second transmission based on the transmission being a CSI-RS transmission. In an example, the CSI-RS of the CSI-RS transmission is NZP-CSI-RS or ZP-CSI-RS.

In one embodiment, the first transmission and the second transmission are on a same serving cell.

In one embodiment, the first transmission and the second transmission are on a same spectrum.

In one embodiment, the first transmission and the second transmission are on a same carrier.

Referring back to FIGS. 3 and 4, in one exemplary embodiment of a base station, the device 300 includes a program code 312 stored in the memory 310. The CPU 308 may execute program code 312 to enable the base station (i) to perform a first transmission without LBT, wherein the first transmission is a SSB transmission, and (ii) to perform LBT for a second transmission for a signal other than SSB. Furthermore, the CPU 308 can execute the program code 312 to perform one, some and/or all of the above-described actions and steps and/or others described herein.

Figure 9:
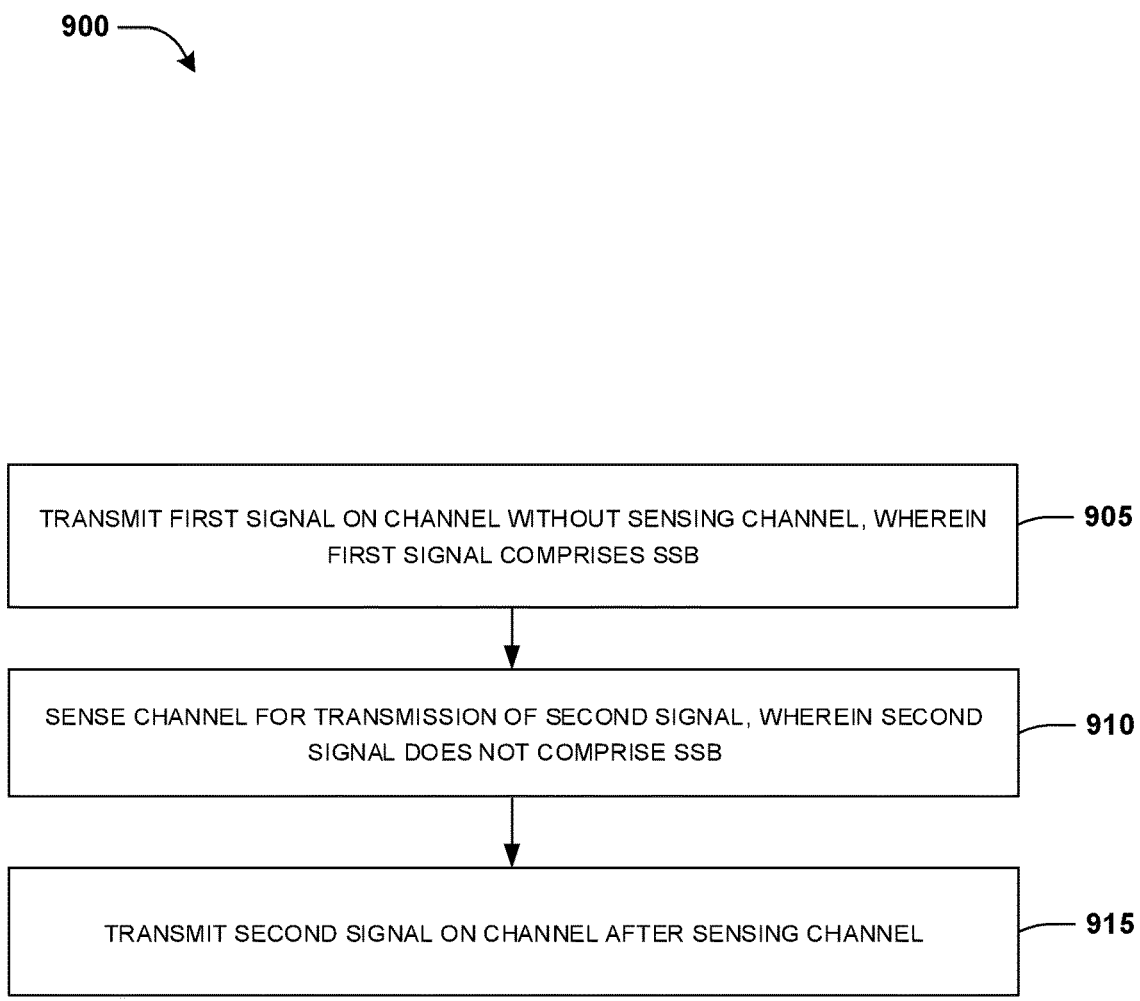
FIG. 9 is a flow chart according to one exemplary embodiment.

FIG. 9 is a flow chart 900 according to one exemplary embodiment from the perspective of a base station. In step 905, the base station transmits a first signal on a channel without sensing the channel, wherein the first signal comprises a SSB (e.g., the first signal is a SSB). In an example, prior to transmitting the first signal, the base station does not sense the channel to determine whether or not the channel is available for utilization (e.g., available for utilization for transmitting the first signal). In an example, the base station transmits the first signal without determining whether or not the channel is available for utilization for transmitting the first signal. In an example, the base station does not sense the channel for transmitting the first signal. In step 910, the base station senses the channel for a transmission of a second signal, wherein the second signal does not comprise a SSB. In an example, the transmission of the second signal does not comprise transmission of a SSB. In step 915, the base station transmits the second signal on the channel after sensing the channel. In an example, the base station transmits the second signal in response to sensing the channel. In an example, sensing the channel for the transmission of the second signal is performed to determine whether or not the channel (on which the transmission of the second signal is to be performed, for example) is available for utilization. In an example, the base station may sense the channel to detect presence or absence of one or more signals on the channel. The base station may determine that the channel is available for utilization based on detecting (via sensing the channel) absence of one or more signals on the channel (e.g., detecting silence of the channel). Detecting absence of one or more signals on the channel may comprise detecting no signal on the channel. Alternatively and/or additionally, detecting absence of one or more signals on the channel may comprise detecting one or more signals, on the channel, with one or more strength levels that are less than a threshold strength level. The base station may determine that the channel is not available for utilization based on detecting (via sensing the channel) presence of one or more signals (e.g., one or more signals with one or more strength levels that exceed a threshold strength level) on the channel. The base station may perform the transmission of the second signal upon and/or after determining that the channel is available for utilization. In an example in which it is determined that the channel is not available for utilization, the base station may delay the transmission of the second signal (e.g., the transmission of the second signal may be delayed to upon and/or after a time in which the base station determines that the channel is available for utilization).

In one embodiment, the second signal is a CSI-RS. In an example, the CSI-RS is NZP-CSI-RS or ZP-CSI-RS.

In one embodiment, the second signal is a PDCCH (e.g., a PDCCH signal). In an example, the PDCCH is unicast PDCCH scheduling user plane data (e.g., a unicast PDCCH signal comprising scheduling information that schedules user plane data).

In one embodiment, the second signal is a PDSCH (e.g., a PDSCH signal).

In one embodiment, the base station operates in a shared spectrum (e.g., an unlicensed spectrum). In an example, the base station transmits the first signal and the second signal in the shared spectrum.

In one embodiment, the base station determines whether or not to sense the channel for a transmission (e.g., a transmission on the channel) based on whether or not the transmission is a SSB transmission (e.g., based on whether or not the transmission comprises transmission of a SSB). In an example, the base station may determine to sense the channel for a transmission (e.g., a transmission on the channel) based on a determination that the transmission is not a SSB transmission (e.g., the transmission comprises transmission of a signal other than a SSB and/or the transmission does not comprise transmission of a SSB). In an example, the base station may determine not to sense the channel for a transmission (e.g., a transmission on the channel) based on a determination that the transmission is a SSB transmission (e.g., the transmission comprises transmission of a SSB).

In one embodiment, the base station performs a transmission, on the channel, without sensing the channel (e.g., without sensing the channel for the transmission) if the transmission is a SSB transmission.

In one embodiment, the base station transmits the first signal on the channel without sensing the channel based on the first signal comprising a SSB. In an example, the first signal is a discovery burst.

In one embodiment, the base station performs a transmission (e.g., a transmission on the channel) after sensing the channel (e.g., after sensing the channel for the transmission) if the transmission is not a SSB transmission.

In one embodiment, the base station performs a transmission (e.g., a transmission on the channel) after sensing the channel if the transmission is a PDCCH transmission. In an example, the PDCCH of the PDCCH transmission is unicast PDCCH scheduling user plane data (e.g., the PDCCH transmission is a unicast PDCCH transmission of scheduling information that schedules user plane data).

In one embodiment, the base station performs a transmission (e.g., a transmission on the channel) after sensing the channel if the transmission is a CSI-RS transmission. In an example, the CSI-RS of the CSI-RS transmission is NZP-CSI-RS or ZP-CSI-RS.

In one embodiment, the second signal is not a discovery burst.

In one embodiment, the base station senses the channel for the transmission of the second signal based on the second signal not comprising a SSB (e.g., based on the transmission of the second signal not comprising transmission of a SSB).

In one embodiment, the base station senses the channel for the transmission of the second signal based on the second signal being a PDCCH (e.g., a PDCCH signal). In an example, the PDCCH is unicast PDCCH scheduling user plane data (e.g., a unicast PDCCH signal comprising scheduling information that schedules user plane data).

In one embodiment, the base station senses the channel for the transmission of the second signal based on the second signal being a CSI-RS. In an example, the CSI-RS is NZP-CSI-RS or ZP-CSI-RS. In an example, the second signal is not a discovery burst.

In one embodiment, the first signal and the second signal are transmitted on a same serving cell.

In one embodiment, the first signal and the second signal are transmitted on a same spectrum.

In one embodiment, the first signal and the second signal are transmitted on a same carrier.

Referring back to FIGS. 3 and 4, in one exemplary embodiment of a base station, the device 300 includes a program code 312 stored in the memory 310. The CPU 308 may execute program code 312 to enable the base station (i) to transmit a first signal on a channel without sensing the channel, wherein the first signal comprises a SSB, (ii) to sense the channel for a transmission of a second signal, wherein the second signal does not comprise a SSB; and (iii) to transmit the second signal on the channel after sensing the channel. Furthermore, the CPU 308 can execute the program code 312 to perform one, some and/or all of the above-described actions and steps and/or others described herein.

With respect to one or more of the embodiments provided with respect to FIGS. 8-9, in some examples, SSB may be replaced with a type of signal other than SSB, such as at least one of a CSI-RS, a PDCCH signal, a PDSCH signal, etc. In an example, the base station may perform a transmission of a signal on a channel without performing LBT for the transmission (and/or without sensing the channel for the transmission) based on the signal being the type of signal. In an example, the base station may perform LBT (and/or may sense a channel) for a transmission based on the transmission comprising transmission of a signal other than the type of signal (and/or based on the transmission not comprising transmission of a signal that is the type of signal).

A communication device (e.g., a UE, a base station, a network node, etc.) may be provided, wherein the communication device may comprise a control circuit, a processor installed in the control circuit and/or a memory installed in the control circuit and coupled (e.g., operatively coupled) to the processor. The processor may be configured to execute a program code stored in the memory to perform method steps illustrated in FIGS. 6-9. Furthermore, the processor may execute the program code to perform one, some and/or all of the above-described actions and steps and/or others described herein.

A computer-readable medium may be provided. The computer-readable medium may be a non-transitory computer-readable medium. The computer-readable medium may comprise a flash memory device, a hard disk drive, a disc (e.g., a magnetic disc and/or an optical disc, such as at least one of a digital versatile disc (DVD), a compact disc (CD), etc.), and/or a memory semiconductor, such as at least one of static random access memory (SRAM), dynamic random access memory (DRAM), synchronous dynamic random access memory (SDRAM), etc. The computer-readable medium may comprise processor-executable instructions, that when executed cause performance of one, some and/or all method steps illustrated in FIGS. 6-9, and/or one, some and/or all of the above-described actions and steps and/or others described herein.

It may be appreciated that applying one or more of the techniques presented herein may result in one or more benefits including, but not limited to, increased efficiency and/or increased speed of communication between devices (e.g., a UE and/or a base station). The increased efficiency and/or the increased speed may be a result of enabling a device to more efficiently perform channel access and/or transmission with or without LBT and/or with different types of LBT. Alternatively and/or additionally, the increased efficiency and/or increased speed may be a result of enabling the device to determine whether or not to perform LBT and/or to select a type of LBT for channel access and/or transmission.

Various aspects of the disclosure have been described above. It should be apparent that the teachings herein may be embodied in a wide variety of forms and that any specific structure, function, or both being disclosed herein is merely representative. Based on the teachings herein one skilled in the art should appreciate that an aspect disclosed herein may be implemented independently of any other aspects and that two or more of these aspects may be combined in various ways. For example, an apparatus may be implemented or a method may be practiced using any number of the aspects set forth herein. In addition, such an apparatus may be implemented or such a method may be practiced using other structure, functionality, or structure and functionality in addition to or other than one or more of the aspects set forth herein. As an example of some of the above concepts, in some aspects concurrent channels may be established based on pulse repetition frequencies. In some aspects concurrent channels may be established based on pulse position or offsets. In some aspects concurrent channels may be established based on time hopping sequences. In some aspects concurrent channels may be established based on pulse repetition frequencies, pulse positions or offsets, and time hopping sequences.

Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Those of skill would further appreciate that the various illustrative logical blocks, modules, processors, means, circuits, and algorithm steps described in connection with the aspects disclosed herein may be implemented as electronic hardware (e.g., a digital implementation, an analog implementation, or a combination of the two, which may be designed using source coding or some other technique), various forms of program or design code incorporating instructions (which may be referred to herein, for convenience, as "software" or a "software module"), or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

In addition, the various illustrative logical blocks, modules, and circuits described in connection with the aspects disclosed herein may be implemented within or performed by an integrated circuit ("IC"), an access terminal, or an access point. The IC may comprise a general purpose processor, a digital signal processor (DSP), an application specific integrated circuit (ASIC), a field programmable gate array (FPGA) or other programmable logic device, discrete gate or transistor logic, discrete hardware components, electrical components, optical components, mechanical components, or any combination thereof designed to perform the functions described herein, and may execute codes or instructions that reside within the IC, outside of the IC, or both. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

It is understood that any specific order or hierarchy of steps in any disclosed process is an example of a sample approach. Based on design preferences, it is understood that the specific order or hierarchy of steps in the processes may be rearranged while remaining within the scope of the present disclosure. The accompanying method claims present elements of the various steps in a sample order, and are not meant to be limited to the specific order or hierarchy presented.

The steps of a method or algorithm described in connection with the aspects disclosed herein may be embodied directly in hardware, in a software module executed by a processor, or in a combination of the two. A software module (e.g., including executable instructions and related data) and other data may reside in a data memory such as RAM memory, flash memory, ROM memory, EPROM memory, EEPROM memory, registers, a hard disk, a removable disk, a CD-ROM, or any other form of computer-readable storage medium known in the art. A sample storage medium may be coupled to a machine such as, for example, a computer/processor (which may be referred to herein, for convenience, as a "processor") such the processor can read information (e.g., code) from and write information to the storage medium. A sample storage medium may be integral to the processor. The processor and the storage medium may reside in an ASIC. The ASIC may reside in user equipment. In the alternative, the processor and the storage medium may reside as discrete components in user equipment. Alternatively and/or additionally, in some aspects any suitable computer-program product may comprise a computer-readable medium comprising codes relating to one or more of the aspects of the disclosure. In some aspects a computer program product may comprise packaging materials.

While the disclosed subject matter has been described in connection with various aspects, it will be understood that the disclosed subject matter is capable of further modifications. This application is intended to cover any variations, uses or adaptation of the disclosed subject matter following, in general, the principles of the disclosed subject matter, and including such departures from the present disclosure as come within the known and customary practice within the art to which the disclosed subject matter pertains.

The invention claimed is:

1. A method of a base station, the method comprising:
    determining, by the base station, whether or not to perform Listen Before Talk (LBT) for a first transmission based on whether or not the first transmission is a Synchronization Signal Block (SSB) transmission;
    performing, by the base station, the first transmission without LBT based on a determination that the first transmission is the SSB transmission;
    determining, by the base station, whether or not to perform LBT for a second transmission based on whether or not the second transmission is for a signal other than SSB; and
    performing, by the base station, LBT for the second transmission based on a determination that the second transmission is for the signal other than SSB.

2. The method of claim 1, wherein:
    the signal other than SSB is a Channel State Information Reference Signal (CSI-RS).

3. The method of claim 1, wherein:
    the signal other than SSB is a Physical Downlink Control Channel (PDCCH).

4. The method of claim 1, wherein:
    the signal other than SSB associated with the second transmission for which LBT was performed is a Physical Downlink Shared Channel (PDSCH).

5. The method of claim 1, wherein:
    the base station operates in a shared spectrum.

6. The method of claim 1, further comprising:
determining whether or not to perform LBT for a transmission based on whether or not the transmission is the SSB transmission.

7. The method of claim 1, wherein:
performing LBT for the second transmission is based on the second transmission being a Physical Downlink Control Channel (PDCCH) transmission.

8. The method of claim 1, wherein the first transmission and the second transmission are at least one of:
on a same serving cell;
on a same spectrum; or
on a same carrier.

9. A method of a base station, the method comprising:
transmitting a first signal on a channel without sensing the channel, wherein the first signal comprises a Synchronization Signal Block (SSB);
determining whether or not to sense the channel for a transmission of a second signal on the channel based on whether or not the transmission of the second signal on the channel comprises a SSB transmission;
sensing the same channel on which the first signal was transmitted without sensing the channel for the transmission of the second signal based on a determination that the second signal does not comprise a SSB; and
transmitting the second signal on the same channel on which the first signal was transmitted without sensing the channel after sensing the channel.

10. The method of claim 9, wherein:
the second signal is a Channel State Information Reference Signal (CSI-RS).

11. The method of claim 9, wherein:
the second signal is a Physical Downlink Control Channel (PDCCH).

12. The method of claim 9, wherein:
the second signal is a Physical Downlink Shared Channel (PDSCH).

13. The method of claim 9, wherein:
the base station operates in a shared spectrum.

14. The method of claim 9, further comprising:
determining whether or not to sense the channel for a transmission on the channel based on whether or not the transmission on the channel is a SSB transmission.

15. The method of claim 9, wherein:
transmitting the first signal on the channel without sensing the channel is performed based on the first signal comprising the SSB.

16. The method of claim 9, wherein the first signal and the second signal are transmitted on at least one of:
a same serving cell;
a same spectrum; or
a same carrier.

17. A base station, comprising:
a control circuit;
a processor installed in the control circuit; and
a memory installed in the control circuit and coupled to the processor, wherein the processor is configured to execute a program code stored in the memory to perform operations, the operations comprising:
transmitting a first signal on a channel without sensing the channel, wherein the first signal comprises a Synchronization Signal Block (SSB);
determining whether or not to sense the channel for a transmission of a second signal on the channel based on whether or not the transmission of the second signal on the channel comprises a SSB transmission;
sensing the same channel on which the first signal was transmitted without sensing the channel for the transmission of the second signal based on a determination that the second signal does not comprise the SSB; and
transmitting the second signal on the same channel on which the first signal was transmitted without sensing the channel after sensing the channel.

18. The base station of claim 17, wherein:
the second signal is a Channel State Information Reference Signal (CSI-RS).

19. The method of claim 1, comprising:
determining, by the base station, whether or not to perform LBT for the second transmission based on whether or not the second transmission is an SSB transmission,
wherein performing the LBT for the second transmission is based on a determination that the second transmission is for a signal other than SSB.

20. The method of claim 1, wherein:
the signal other than SSB is a Physical Downlink Control Channel (PDCCH) scheduling user plane data.

21. The method of claim 1, wherein:
the signal other than SSB is a unicast Physical Downlink Shared Channel (PDSCH) with user plane data.

* * * * *